United States Patent
Iwami

(10) Patent No.: US 10,101,854 B2
(45) Date of Patent: Oct. 16, 2018

(54) CONDUCTIVE FILM, DISPLAY DEVICE HAVING THE SAME, AND METHOD OF EVALUATING CONDUCTIVE FILM

(71) Applicant: FUJIFILM Corporation, Tokyo (JP)

(72) Inventor: Kazuchika Iwami, Ashigara-kami-gun (JP)

(73) Assignee: FUJIFILM Corporation, Minato-ku, Tokyo (JP)

( * ) Notice: Subject to any disclaimer, the term of this patent is extended or adjusted under 35 U.S.C. 154(b) by 43 days.

(21) Appl. No.: 15/331,972

(22) Filed: Oct. 24, 2016

(65) Prior Publication Data

US 2017/0052643 A1    Feb. 23, 2017

Related U.S. Application Data

(63) Continuation of application No. PCT/JP2015/062726, filed on Apr. 27, 2015.

(30) Foreign Application Priority Data

May 2, 2014    (JP) .................................. 2014-095165

(51) Int. Cl.
*G06F 3/045*    (2006.01)
*G06F 3/041*    (2006.01)
(Continued)

(52) U.S. Cl.
CPC ........ *G06F 3/0418* (2013.01); *G02F 1/13338* (2013.01); *G06F 3/044* (2013.01);
(Continued)

(58) Field of Classification Search
CPC .... G06F 3/0418; G06F 3/044; G02F 1/13338; G09F 9/302; G09G 3/2008
(Continued)

(56) References Cited

U.S. PATENT DOCUMENTS

2010/0033405 A1* 2/2010 Aragaki ................. G09G 3/001
345/55
2013/0106441 A1* 5/2013 Yilmaz ................. G06F 3/0414
324/658
(Continued)

FOREIGN PATENT DOCUMENTS

JP    2013-213858 A    10/2013

OTHER PUBLICATIONS

Communication dated Mar. 20, 2017, from the European Patent Office in counterpart European Application No. 15786248.3.
(Continued)

*Primary Examiner* — Prabodh M Dharia
(74) *Attorney, Agent, or Firm* — Sughrue Mion, PLLC

(57) ABSTRACT

In a conductive film, a wiring pattern is formed such that an indicator of evaluation of moirés is equal to or less than a predetermined value. In frequencies and intensities of moirés of the respective colors calculated from peak frequencies and peak intensities of respective two-dimensional Fourier spectra of transmittance image data and luminance image data of the sub-pixel array patterns of the respective colors, the indicator of evaluation is calculated from evaluation values of moirés obtained by applying human visual response characteristics in accordance with an observation distance to intensities of moirés at frequencies of moirés equal to or less than the maximum frequency of the moirés prescribed on the basis of a display resolution of the display unit.

20 Claims, 12 Drawing Sheets

(51) Int. Cl.
*G06F 3/044* (2006.01)
*G09F 9/302* (2006.01)
*G09G 3/20* (2006.01)
*G02F 1/1333* (2006.01)
*G02F 1/1335* (2006.01)

(52) U.S. Cl.
CPC ........... G09F 9/302 (2013.01); G09G 3/2003 (2013.01); *G02F 1/133514* (2013.01); *G02F 2201/14* (2013.01); *G02F 2201/52* (2013.01); *G02F 2203/69* (2013.01); *G06F 2203/04112* (2013.01); *G09G 2300/0452* (2013.01); *G09G 2320/029* (2013.01); *G09G 2320/0666* (2013.01)

(58) Field of Classification Search
USPC ........ 345/51, 55, 156–184; 324/658; 348/51
See application file for complete search history.

(56) References Cited

U.S. PATENT DOCUMENTS

| | | | | |
|---|---|---|---|---|
| 2013/0234974 A1* | 9/2013 | Guard | ..................... | G06F 3/044 345/174 |
| 2013/0314512 A1* | 11/2013 | Watanabe | .......... | H04N 13/0402 348/51 |
| 2014/0078025 A1* | 3/2014 | Allio | .................. | G02B 27/2214 345/55 |
| 2015/0015979 A1 | 1/2015 | Iwami et al. | | |
| 2015/0324046 A1* | 11/2015 | Lo | .......................... | G06F 3/0416 345/173 |
| 2015/0346866 A1* | 12/2015 | Kusunoki | ............. | G06F 1/1652 345/174 |
| 2016/0005600 A1* | 1/2016 | Bae | .................... | H01L 21/02675 257/72 |
| 2017/0102342 A1* | 4/2017 | Iwami | .............. | G01N 21/95692 |
| 2017/0124964 A1* | 5/2017 | Teranishi | ................ | G09G 3/207 |
| 2017/0131810 A1* | 5/2017 | Donnelly | .............. | G06F 3/0412 |
| 2017/0200263 A1* | 7/2017 | Iwami | ................... | G06T 7/0004 |
| 2017/0221195 A1* | 8/2017 | Iwami | .................... | G06T 7/0004 |
| 2017/0221196 A1* | 8/2017 | Yamaguchi | ............ | G06T 7/0004 |
| 2017/0243342 A1* | 8/2017 | Iwami | ................... | G06T 7/0004 |
| 2017/0358478 A1* | 12/2017 | Thothadri | ............ | H01L 21/6835 |
| 2018/0018047 A1* | 1/2018 | Iwami | ..................... | G06F 3/044 |

OTHER PUBLICATIONS

International Preliminary Report on Patentability and Written Opinion, dated Nov. 17, 2016, in International Application No. PCT/JP2015/062726, 7 pages in English.
International Search Report of PCT/JP2015/062726, dated Aug. 4, 2015. [PCT/ISA/210].
Written Opinion of PCT/JP2015/062726, dated Aug. 4, 2015. [PCT/ISA/237].
The First Office Action, dated Aug. 3, 2018, issued in corresponding Chinese Application No. 201580023625.2, 18 pages in English and Chinese.

* cited by examiner

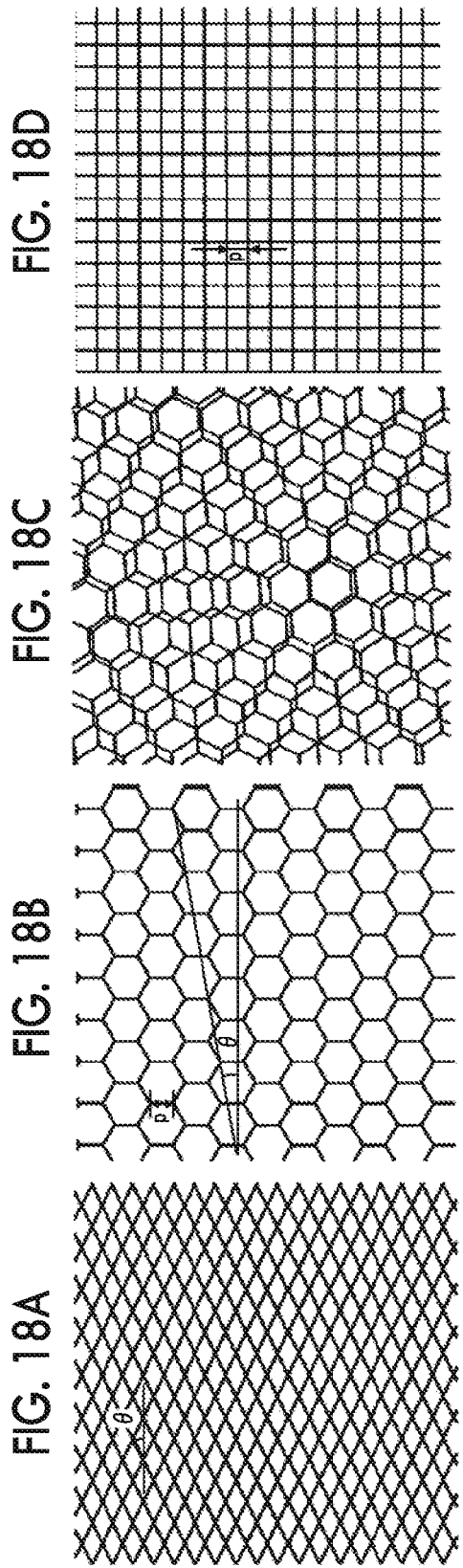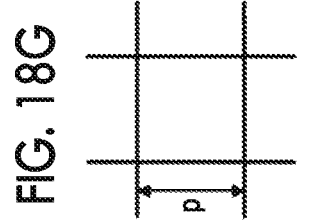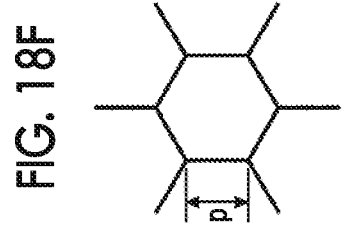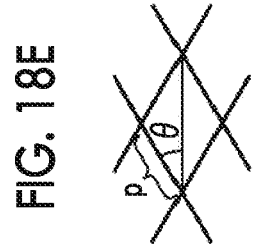

CONDUCTIVE FILM, DISPLAY DEVICE HAVING THE SAME, AND METHOD OF EVALUATING CONDUCTIVE FILM

CROSS-REFERENCE TO RELATED APPLICATIONS

This application is a Continuation of PCT International Application No. PCT/JP2015/062726 filed on Apr. 27, 2015, which claims priority under 35 U.S.C. § 119(a) to Japanese Patent Application No. 2014-095165 filed on May 2, 2014. The above application is hereby expressly incorporated by reference, in its entirety, into the present application.

BACKGROUND OF THE INVENTION

1. Field of the Invention

The present invention relates to a conductive film, a display device having the same, and a method of evaluating the conductive film. Specifically, the invention relates to a conductive film that is superposed on a display device which has color filters of R (red), G (green), and B (blue), that is, of which openings of sub-pixels have frequencies and intensities different from each other and that has a mesh-shaped wiring pattern capable of providing best image quality in combination with pixel array patterns of the display device, the display device having the same, and a method of evaluating the conductive film.

2. Description of the Related Art

Examples of conductive films, each of which is provided on a display unit of a display device (hereinafter referred to as a display), include a conductive film for a touch panel having a conductive layer formed of thin metal lines which have a mesh-shaped wiring pattern (hereinafter referred to as a mesh pattern), a conductive film for an electromagnetic shield, and the like.

Regarding such conductive films, since there is a problem that a moiré caused by interference between a mesh pattern and a pixel array pattern (for example referred to as an array pattern of RGB color filters or a black matrix (hereinafter also referred to as a BM) pattern as a reverse pattern thereof) of a display may be visually perceived, various conductive films having a mesh pattern due to which a moiré is not visually perceived or unlikely to be visually perceived have been proposed (for example, refer to JP2013-213858A).

JP2013-213858A according to the present application of the applicants discloses a conductive film that has a mesh pattern which allows the sum of intensities of moirés having moiré frequencies included in a predetermined frequency range defined on the basis of visual response characteristics to be equal to or less than a predetermined value, with respect to frequencies and intensities of moirés obtained by applying human visual response characteristics to the frequency information and the intensity information of moirés respectively calculated from peak frequencies and peak intensities of spectrum peaks of two-dimensional Fourier spectra (2DFFTSp) of transmittance image data of respective patterns of a mesh pattern of the conductive film and a pixel array (BM) pattern of the display.

In such a manner, in JP2013-213858A, it is possible to prevent moirés from occurring, and it is possible to greatly improve visibility.

SUMMARY OF THE INVENTION

However, JP2013-213858A proposes a method of estimating and digitizing a visible moiré in combination between the pixel array pattern of the display and the wiring pattern of the conductive film. However, in JP2013-213858A, the pixel array pattern of the display, which is used when the moiré is estimated, is typified by a sub-pixel array pattern of a sub-pixel of a single color, for example, a sub-pixel array pattern of a G channel. Hence, JP2013-213858A shows a result in which a Fourier spectrum of the display calculated when the moiré is estimated depends on spatial frequency characteristics of a sub-pixel of a single color, for example, a G channel.

As a result, there is the following problem: a condition, in which visibility can be improved using a moiré numerical value calculated in JP2013-213858A, is limited to a case where opening shapes of RGB color filters included in pixels of the display are substantially the same and phases are different only in a direction of cycling of the positions of the respective openings. That is, there is the following problem: the target display is limited to a display in which the opening shapes of the RGB color filters in one pixel, that is, the opening shapes of the sub-pixels have the same shape, and repeated patterns (sub-pixel array patterns) of the sub-pixels are limited to patterns which have phases deviating from each other but can be regarded as the same pixel array patterns.

However, recently, for example, as typical pixels of an organic EL display (OELD: Organic ElectroLuminescence Display), pixels having the following characteristics are used: it is not necessary for opening shapes of RGB color filters, that is, shapes of sub-pixels to be substantially the same; and phases thereof, that is, phases of repeated patterns and cycles thereof are arbitrary (random). In the pixels arbitrarily configured in such a manner, visibility of a moiré, which is visually perceived due to lamination of a conductive film having a mesh-shaped wiring pattern on the pixels of the display, is different for each of all the respective sub-pixel array patterns of RGB. However, in a technology disclosed in JP2013-213858A, only the sub-pixel array pattern of G is considered, and thus there is a problem in that the moiré trouble cannot be corrected.

That is, in the display using pixels randomly configured in such a manner, in order to improve the moiré visibility of the conductive film laminated on a display screen of the display, by digitizing moiré visibility for each of RGB, it is necessary to consider all numerical values obtained through the digitizing. However, there is a problem in that the numerical values are not considered at all in JP2013-213858A.

In order to solve the problems of the related art, the present invention has an object to provide a conductive film capable of preventing moirés from occurring regardless of an observation distance and greatly improving visibility of a display screen of a display unit in a display device, the display device having the same, and a method of evaluating the conductive film. The display device has a display unit that satisfies at least any one of a condition in which the display unit includes at least two sub-pixels configured such that pixel structures (shapes, phases) of the display are not the same, that is, shapes of the sub-pixels, for example, opening shapes of color filters of RGB are different from each other, a condition in which a cycle of repetition of at least one sub-pixel is different from a cycle of repetition of pixels, or a condition in which a bar center of a single sub-pixel within a single pixel of the pixels is at a position different from that of a straight line connecting the barycenters of the other sub-pixels.

Further, in addition to the above-mentioned object, another object of the present invention is to provide a conductive film, a display device having the same, and a method of evaluating the conductive film. In a design of a mesh pattern of the conductive film in a case where the opening shapes of the RGB sub-pixels of the display have frequencies and intensities different from each other, the conductive film has a mesh pattern capable of providing best image quality in combination with sub-pixel array patterns of the display.

As a result of a keen examination performed in order to achieve the object, the applicants of the present application found the following fact: in a display unit formed of pixels in which shapes or cycles of sub-pixels are arbitrary or random, in order to improve visibility of a moiré which is visually perceived due to lamination of a conductive layer having a mesh pattern of thin metal lines, it is necessary to digitize the visibility of the moiré for each of the RGB sub-pixels so as to perform evaluation on the basis of a worst value at which the moiré is most likely to occur, that is, a maximum value of the visibility. Thus, the applicants proposed the present invention.

That is, according to a first aspect of the present invention, there is provided a conductive film that is provided on a display unit of a display device, the conductive film further comprising: a transparent substrate; and a conductive portion that is formed on at least one surface of the transparent substrate and has a plurality of thin metal lines. The plurality of thin metal lines has a wiring pattern formed in a mesh shape, and a plurality of opening portions is arrayed on the conductive portion. In the display unit, pixels, which include a plurality of sub-pixels emitting light with a plurality of colors that are at least three colors different from each other, are arrayed in pixel array patterns which are repeated in a certain direction and a direction perpendicular to the certain direction. The display unit satisfies at least any one of a condition in which forms of the sub-pixels for at least two colors different from each other among the plurality of colors are different, a condition in which cycles of sub-pixel array patterns formed by arrays of the sub-pixels having respective colors of the plurality of colors are different, or a condition in which at least one of barycenters of the plurality of sub-pixels within a single pixel of the pixels is at a position different from that of a straight line connecting at least two of the barycenters of the other sub-pixels. The conductive film is provided on the display unit such that the wiring pattern of the conductive portion overlaps with the pixel array patterns of the display unit. From at least one point of view, the wiring pattern is formed such that an indicator of evaluation of moirés is equal to or less than an evaluation threshold value, where in frequencies and intensities of the moirés of the respective colors calculated from a first peak frequency and a first peak intensity of a plurality of first spectrum peaks of two-dimensional Fourier spectra of transmittance image data of the wiring pattern and a second peak frequency and a second peak intensity of a plurality of second spectrum peaks of two-dimensional Fourier spectra of luminance image data of the sub-pixel array patterns of the respective colors of the plurality of colors, the indicator of evaluation is calculated from evaluation values of the moirés of the respective colors obtained by applying human visual response characteristics in accordance with an observation distance to intensities of the moirés equal to or greater than a first intensity threshold value among intensities of the moirés at frequencies of the moirés equal to or less than a frequency threshold value prescribed on the basis of a display resolution of the display unit.

Further, in order to achieve the object, according to a second aspect of the present invention, there is provided a display device comprising: a display unit in which pixels, which include a plurality of sub-pixels emitting light with a plurality of colors that are at least three colors different from each other, are arrayed in pixel array patterns which are repeated in a certain direction and a direction perpendicular to the certain direction, the display unit satisfying at least one of a condition in which forms of the sub-pixels for at least two colors different from each other among the plurality of colors are different, or a condition in which cycles of sub-pixel array patterns formed by arrays of the sub-pixels having respective colors are different; and the conductive film according to the first aspect, the conductive film being provided on the display unit.

Furthermore, in order to achieve the object, according to a third aspect of the present invention, there is provided a method of evaluating a conductive film that is provided on a display unit of a display device and has a wiring pattern which is formed of a plurality of thin metal lines and has a mesh shape and in which a plurality of opening portions is arrayed, the method comprising: causing the display unit, in which pixels including a plurality of sub-pixels emitting light with a plurality of colors that are at least three colors different from each other are arrayed in pixel array patterns which are repeated in a certain direction and a direction perpendicular to the certain direction, to satisfy at least any one of a condition in which forms of the sub-pixels for at least two colors different from each other among the plurality of colors are different, a condition in which cycles of sub-pixel array patterns formed by arrays of the sub-pixels having respective colors of the plurality of colors are different, or a condition in which at least one of barycenters of the plurality of sub-pixels within a single pixel of the pixels is at a position different from that of a straight line connecting at least two of the barycenters of the other sub-pixels; acquiring transmittance image data of the wiring pattern and luminance image data of the sub-pixel array pattern of each color of the plurality of colors of the display unit; calculating a first peak frequency and a first peak intensity of a plurality of first spectrum peaks of two-dimensional Fourier spectra of transmittance image data of the wiring pattern and a second peak frequency and a second peak intensity of a plurality of second spectrum peaks of two-dimensional Fourier spectra of luminance image data of the sub-pixel array patterns of the respective colors of the plurality of colors, for each color, by performing two-dimensional Fourier transform on the transmittance image data of the wiring pattern and the luminance image data of the sub-pixel array pattern, from at least one point of view; calculating frequencies and intensities of moirés of the respective colors of the plurality of colors from the first peak frequency and the first peak intensity of the wiring pattern and the second peak frequency and the second peak intensity of the sub-pixel array patterns of the respective plurality of colors calculated in the above-mentioned manner; selecting moirés having frequencies equal to or less than a frequency threshold value and intensities equal to or greater than a first intensity threshold value prescribed on the basis of a display resolution of the display unit, among the frequencies and intensities of the moirés of the respective colors calculated in the above-mentioned manner; acquiring evaluation values of the moirés of the respective colors by applying human visual response characteristics in accordance with an observation distance to the intensities of the moirés at respective frequencies of the moirés of the respective colors selected in the above-mentioned manner; calculating an indicator of evaluation of the moirés from the evaluation values of the moirés of the respective colors acquired in the above-mentioned manner; and evaluating the conductive film of which the indicator of evaluation of the moirés calculated in the above-mentioned manner is equal to or less than a predetermined value.

In the third aspect, it is preferable that the luminance image data of the sub-pixel array pattern of each color of the plurality of colors of the display unit is normalized luminance data that is obtained by normalizing the luminance image data obtained by converting captured image data, which is obtained by capturing an image of the sub-pixel array pattern of a color displayed on the display screen of the display unit for each color, into luminance values.

In the first aspect, the second aspect, and the third aspect, it is preferable that the evaluation threshold value is −2.70 and the indicator of evaluation is equal to or less than −2.70 as a common logarithm. It is more preferable that the evaluation threshold value is −2.80 and the indicator of evaluation is equal to or less than −2.80 as a common logarithm. It is yet more preferable that the evaluation threshold value is −3.00 and the indicator of evaluation is equal to or less than −3.00 as a common logarithm.

It is preferable that the condition, in which the forms of the sub-pixels are different, includes a condition in which sizes or areas of the sub-pixels are different.

It is preferable that the condition, in which the cycles of the sub-pixel array patterns are different, includes a condition in which, assuming that, in a display screen of the display unit, the certain direction is a horizontal direction, the horizontal direction is an x direction, and a direction perpendicular to the x direction is y direction, cycles of the sub-pixels for at least two colors different from each other do not coincide in at least one direction of the x direction or the y direction.

It is preferable that satisfying the at least any one condition is satisfying any one of a condition in which, regarding any two colors of the plurality of colors, a difference between a position of a barycenter of the sub-pixel for one color and a position of a barycenter of the sub-pixel for the other color in the certain direction is less than 3P/10, a condition in which the difference is greater than 11P/30 and less than 3P/5, and a condition in which the difference is greater than 11P/15, where P is a pixel pitch of the pixel array patterns, or satisfying any one of a condition in which, regarding any single color of the plurality of colors, a difference between a position of a barycenter of the sub-pixel for the single color and a position of a barycenter of the sub-pixel for the single color of an adjacent pixel in the direction perpendicular to the certain direction is less than 9P/10, and a condition in which the difference is greater than 11P/10.

It is preferable that the luminance image data of the sub-pixel array pattern of each color of the plurality of colors is normalized luminance data that is obtained by normalizing the luminance image data obtained by converting captured image data, which is obtained by capturing an image of the sub-pixel array pattern of a color displayed on the display screen of the display unit for each color, into luminance values.

It is preferable that the plurality of colors is three colors such as red, green, and blue, the image of the sub-pixel array pattern of the color displayed on the display screen of the display unit is displayed at a maximum luminance which can be set in the display unit, and the normalized luminance data of each color is normalized by a maximum luminance value of green.

It is preferable that the captured image data of the image of the sub-pixel array pattern of each color of red, green, and blue is image data that is obtained by imaging after adjusting white balance to a white color of a Macbeth chart, assuming that image data of red is R, image data of green is G, image data of blue is B, and a luminance value is Y, the image data R, G, and B of red, green, and blue is converted into a luminance value Y through the following Expression (1).

$$Y=0.300R+0.590G+0.110B \quad (1)$$

It is preferable that the luminance image data of each color is obtained by normalizing the maximum luminance value of green to 1.0.

It is preferable that the luminance image data of the image of the sub-pixel array pattern of each color of red, green, and blue is data that is obtained by setting an integral value, which is calculated by performing integration of a luminance of each XYZ color matching function on spectrum data of each color of red, green, and blue, as a value of mask data created from captured image data which is obtained by displaying each color of red, green, and blue on the sub-pixel of the color and by imaging the color through a microscope, where the spectrum data of each color of red, green, and blue is acquired by displaying each color of red, green, and blue on the sub-pixel of the color and measuring the color by a spectrometer, and the luminance image data of each color is obtained by normalizing the luminance image data of the maximum of green to 1.0.

For example, assuming that a wavelength is $\lambda$, RGB spectrum data pieces of respective colors of red R, green G, and blue B are $Pr(\lambda)$, $Pg(\lambda)$, and $Pb(\lambda)$, and a color matching function, which is used in a case where tristimulus values X, Y, and Z are calculated, is $y(\lambda)$, Yr, Yg, and Yb as integral values, which are luminance values of respective colors of RGB, are represented by the following Expression (3).

$$Yr=\int Pr(\lambda)y(\lambda)d\lambda$$
$$Yg=\int Pg(\lambda)y(\lambda)d\lambda$$
$$Yb=\int Pb(\lambda)y(\lambda)d\lambda \quad (3)$$

It is preferable that the plurality of first spectrum peaks has a peak intensity that is equal to or greater than a first threshold value which is selected from a plurality of spectrum peaks obtained by performing two-dimensional Fourier transform on transmittance image data of the wiring pattern, and for each of the plurality of colors, the plurality of second spectrum peaks has a peak intensity that is equal to or greater than a second threshold value which is selected from a plurality of spectrum peaks obtained by performing two-dimensional Fourier transform on the luminance image data of the sub-pixel array pattern.

It is preferable that a frequency of a moiré corresponding to each color is given as a difference between the first peak frequency and the second peak frequency corresponding to each color, and an intensity of the moiré corresponding to each color is given as a product between the first peak intensity and the second peak intensity corresponding to each color.

It is preferable that an evaluation value of the moiré is calculated by weighting a visual transfer function, which corresponds to the observation distance as the visual response characteristics, to the frequency and the intensity of the moiré through convolution integration.

It is preferable that the visual transfer function VTF is given by the following Expression (2).

$$VTF = 5.05e^{-0.138u}(1 - e^{0.1u}) \quad (2)$$

-continued $$u = \frac{\pi L f_r}{180}$$

Here, u is a spatial frequency (cycle/deg) defined by a solid angle, $f_r$ shown in the above-mentioned Expression (2) is a spatial frequency (cycle/mm) defined by a length, and L is an observation distance (mm).

It is preferable that the indicator of evaluation of the moirés is calculated using a largest evaluation value among the evaluation values of the plurality of the moirés in which a frequency of one of the moirés is weighted in accordance with the observation distance for each color. Further, it is preferable that the indicator of evaluation of the moirés is a largest sum among sums for the plurality of colors, the sums being obtained by adding the largest evaluation values of the frequencies of all the moirés for each color, each of to the largest evaluation values be ing selected with respect to the frequency of one of the moirés for each color.

It is preferable that the first intensity threshold value is −5 as a common logarithm, and the frequency threshold value is a highest frequency of the moirés, and a moiré, which is selected in order to apply the visual response characteristics, has an intensity which is equal to or greater than −5, and has a frequency which is equal to or less than the highest frequency.

It is preferable that assuming that a display pixel pitch of the display unit is Pd μm, the highest frequency of the moirés is given as 1000/Pd cycle/mm.

It is preferable that from at least two points of view of front observation and oblique observation, the evaluation value is obtained for each color of the plurality of colors, and the indicator of evaluation is a largest evaluation value among evaluation values of respective colors obtained in the at least two points of view.

It is preferable that the pixel array patterns are the black matrix patterns.

As described above, according to the present invention, the display device has the display unit that satisfies at least any one of the condition in which the display unit includes at least two sub-pixels configured such that pixel structures (shapes, phases) of the display are not the same, that is, shapes of the sub-pixels, for example, the opening shapes of the color filters of RGB are different from each other, the condition in which the cycle of repetition of at least one sub-pixel is different from the cycle of repetition of pixels, or the condition in which the barycenter of the single sub-pixel within one pixel of the pixels is at the position different from that of the straight line connecting the barycenters of the other sub-pixels. With such a configuration, it is possible to prevent moirés from occurring regardless of the observation distance and greatly improve visibility of the display screen of the display unit even in the display device.

Further, according to another embodiment of the present invention, in addition to the above-mentioned effect, in the design of the mesh pattern of the conductive film in a case where the opening shapes of the RGB sub-pixels of the display have frequencies and intensities different from each other, it is possible to provide best image quality in combination with the sub-pixel array patterns of the display.

In particular, according to the present invention, in a case of using the conductive film as a touch panel electrode, it is possible to prevent a moiré as a great failure of image quality from occurring when being visually perceived, by superposing the conductive film on the black matrix of the display unit of the display device, even if the frequencies and the intensities of the sub-pixel array patterns of the respective colors of the black matrix of the display unit are different. As a result, it is possible to greatly improve visibility of display on a touch panel.

BRIEF DESCRIPTION OF THE DRAWINGS

FIG. 4B is a partially enlarged view of the pixel array patterns of FIG. 4A.

FIGS. 18A, 18B, 18C, and 18D are schematic explanatory diagrams respectively illustrating examples of wiring patterns used in the present invention, and FIGS. 18E, 18F, and 18G are partially enlarged views respectively illustrating wiring patterns shown in FIGS. 18A, 18B, and 18D.

DESCRIPTION OF THE PREFERRED EMBODIMENTS

Hereinafter, a conductive film and a method of evaluating the conductive film according to the present invention will be described in detail with reference to most preferred embodiments shown in the accompanying drawings.

In the following description, a conductive film for a touch panel will be explained as a representative example of the conductive film according to the present invention, but the present invention is not limited to this example. Although described in detail later, the conductive film of the invention may be of any type as long as it is a conductive film provided on a display unit of a display device such as a liquid crystal display (LCD), a plasma display panel (PDP), an organic electroluminescence display (OELD), or an inorganic EL display. The display unit is a display unit in which repetition cycles and intensities of sub-pixels (color filters), that is, sub-pixel array patterns (forms and cycles of the sub-pixels) are not entirely the same in a plurality of colors such as RGB. That is, the display unit is a display unit that has a pixel array pattern (BM pattern) including sub-pixel array patterns different between at least two colors. It is needless to say that the conductive film according to the present invention may be, for example, a conductive film for electromagnetic shields.

Figure 1:
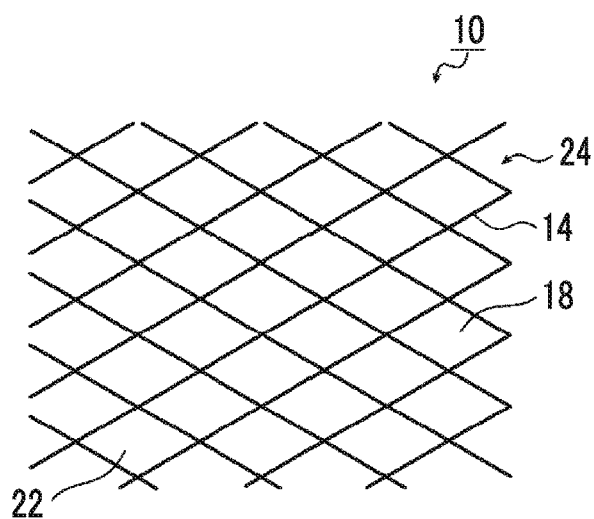
FIG. 1 is a plan view schematically illustrating an example of a conductive film according to a first embodiment of the present invention.
Figure 2:
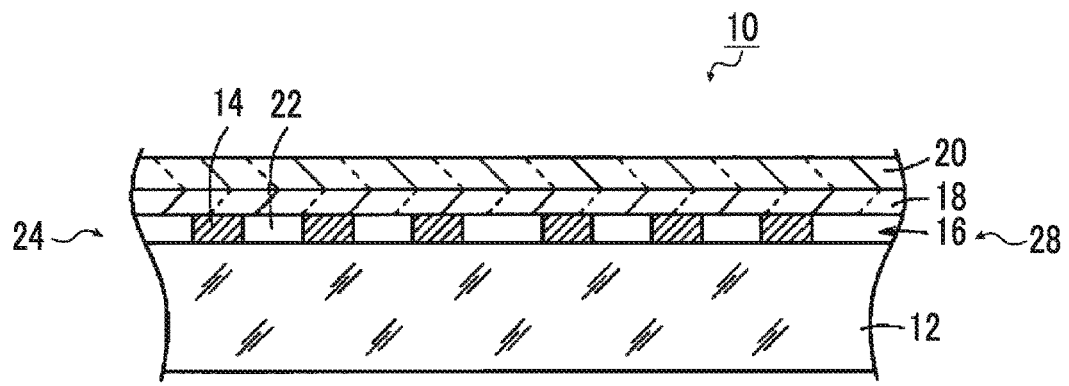
FIG. 2 is a schematic partial cross-sectional view of the conductive film shown in FIG. 1.

FIGS. 1 and 2 are respectively a plan view schematically illustrating an example of a conductive film according to a first embodiment of the present invention and a schematic partial cross-sectional view thereof.

As described in the drawings, a conductive film 10 according to the present embodiment is provided on a display unit of a display device. The conductive film 10 is a conductive film having a wiring pattern that is excellent in suppression of occurrence of moiré with respect to a pattern of the display unit in which color filters having a plurality of colors such as RGB are repeated, that is, a pixel array pattern formed of sub-pixel array patterns, particularly, a wiring pattern that is optimized in terms of moiré visibility with respect to the sub-pixel array patterns which are included in the pixel array pattern and have shapes and cycles different for each color when those are superposed on the pixel array pattern. The conductive film 10 includes a transparent substrate 12, a conductive portion 16 that is formed on one surface of the transparent substrate 12 (a surface on the upper side in FIG. 2) and that is formed of a plurality of thin lines made of metal (hereinafter referred to as "thin metal lines") 14, and a protective layer 20 that is bonded to the substantially entire surface of the conductive portion 16 through an adhesive layer 18 so as to cover the thin metal lines 14.

The transparent substrate 12 is formed of a material having an insulation property and having a high light-permeability, and examples thereof include a resin, glass, and silicon. Examples of the resin include polyethylene terephthalate (PET), polymethyl methacrylate (PMMA), polypropylene (PP), polystyrene (PS), and the like.

The conductive portion 16 is formed of a conductive layer 28 having a wiring pattern 24 of a mesh shape which is formed by the thin metal lines 14 with openings 22 between neighboring thin metal lines 14. The thin metal lines 14 are not particularly limited as long as they are thin lines made of metal having high conductivity, and include thin lines made of a line material such as gold (Au), silver (Ag) or copper (Cu). While it is more preferable indeed in terms of visibility if the thin metal lines 14 have a smaller line width, the line width has only to be 30 μm or less, for instance. For application to a touch panel, the line width of the thin metal lines 14 is preferably equal to or greater than 0.1 μm and equal to or less than 15 μm, more preferably equal to or greater than 1 μm and equal to or less than 9 μm, and still more preferably equal to or greater than 2 μm and equal to or less than 7 μm.

Specifically, the conductive portion 16 has the wiring pattern 24 in which the plurality of thin metal lines 14 is arranged in a mesh shape. In the example shown in the drawing, the mesh shape of the opening 22 is a rhomboid shape, but the present invention is not limited to this example. Any polygonal shape having at least three sides may be employed as long as it can constitute the wiring pattern 24 having moiré visibility optimized for a pixel array pattern including predetermined sub-pixel array patterns to be described later, and the mesh shapes thereof may be equal to or different from each other. Examples of the polygonal shape include equal or different polygons including: triangles such as a regular triangle and an equilateral triangle; quadrangles (rectangles) such as a square (a square lattice, refer to FIG. 18D to be described later) and a rectangle, and a parallelogram (refer to FIG. 19 to be described later); pentagons; and hexagons (a regular hexagon, refer to FIGS. 18B and 18C to be described later). That is, as long as it is a wiring pattern having moiré visibility optimized for a predetermined pixel array pattern formed of different sub-pixel array patterns, a wiring pattern constituted by regular arrangement of openings 22 or a wiring pattern randomized by arrangement of openings 22 having different shapes may be employed.

Further, the mesh shape of the opening portions 22 of the wiring pattern 24 may be symmetric or may be asymmetric. In addition, when one of the x axis and the y axis is defined on two-dimensional xy coordinates, asymmetry of the mesh shape can be defined such that the mesh shape is asymmetric with respect to at least one of the x axis or the y axis.

Figure 19:
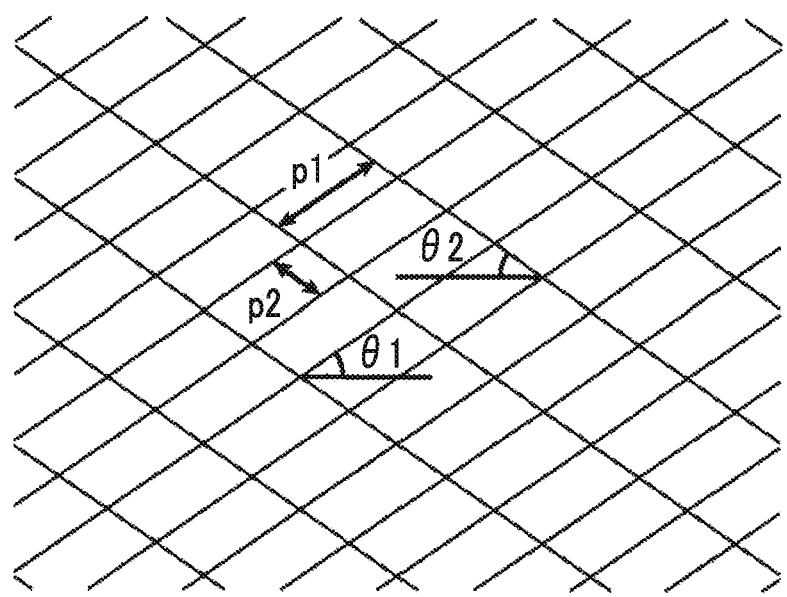
FIG. 19 is a plan view schematically illustrating another example of a wiring pattern of the conductive film of the present invention.

For example, in the mesh shape in a parallelogram having an asymmetric pattern, as shown in FIG. 19, pitches of respective sides of the parallelogram are p1 and p2, and inclination angles of the respective sides of the parallelogram with respect to the y axis are θ1 and θ2. In this case, it is preferable to satisfy at least one of p1≠p2 or θ1≠θ2, but it is more preferable to satisfy both of those. In the mesh shape of the parallelogram having the asymmetric pattern of the example shown in the drawing, p1≠p2 and θ1=θ2.

Also a polygonal-type mesh shape having an asymmetric pattern may be defined such that at least either the pitches or the inclination angles are different.

Figure 17:
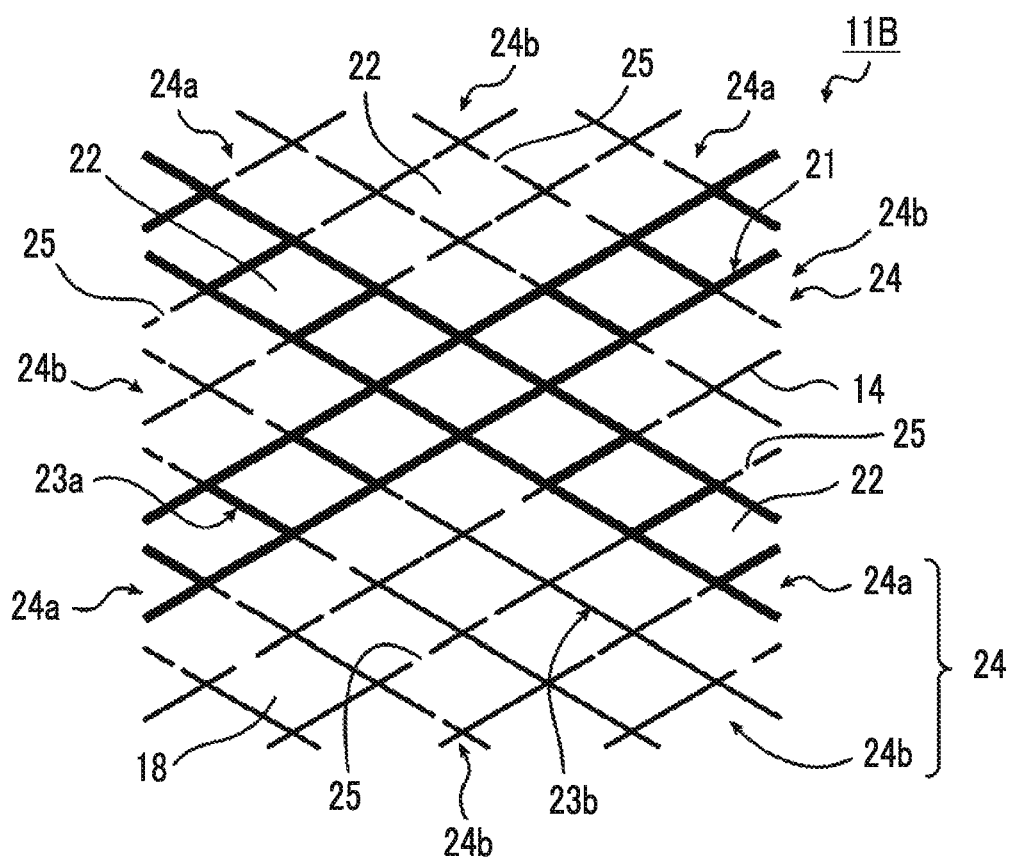
FIG. 17 is a partial enlarged plan view schematically illustrating an example of a conductive film according to another embodiment of the present invention, and a schematic diagram illustrating an example of a plurality of disconnection portions having the mesh pattern.

Further, in the wiring pattern 24, as shown in FIG. 17 which will be described later, disconnections (breaks) may be inserted. As the shape of the mesh-shaped wiring pattern having such breaks, it is possible to employ a shape of a mesh-shaped wiring pattern of a conductive film described in JP2012-276175 relating to the present application of the applicants.

As a material of the adhesive layer 18, a wet lamination adhesive, a dry lamination adhesive, a hot melt adhesive or the like can be used.

Similarly to the transparent substrate 12, the protective layer 20 is formed of a material having a high light-permeability, such as resin, glass, and silicon. The refractive index n1 of the protective layer 20 is preferably a value equal to or close to that of the refractive index n0 of the transparent substrate 12. In this case, the relative refractive index nr1 of the transparent substrate 12 with respect to the protective layer 20 is a value approximate to 1.

In this specification, the refractive index means a refractive index for the light at a wavelength of 589.3 nm (sodium D ray). For example, in regard to resins, the refractive index is defined by ISO 14782: 1999 (corresponding to JIS K 7105) that is an international standard. In addition, the relative refractive index nr1 of the transparent substrate 12 with respect to the protective layer 20 is defined as nr1=n1/n0. Here, the relative refractive index nr1 is preferably in a range equal to or greater than 0.86 and equal to or less than 1.15, and more preferably in a range equal to or greater than 0.91 and equal to or less than 1.08.

By limiting the range of the relative refractive index nr1 as the above-mentioned range to control light transmittance between members of the transparent substrate 12 and the protective layer 20, moiré visibility is further improved. Thus, the conductive film can be improved.

The conductive film 10 according to the first embodiment described above has the conductive portion 16 on only one surface of the transparent substrate 12, but the present invention is not limited to this, and the conductive film 10 may have the conductive portion on both surfaces of the transparent substrate 12.

Figure 3:
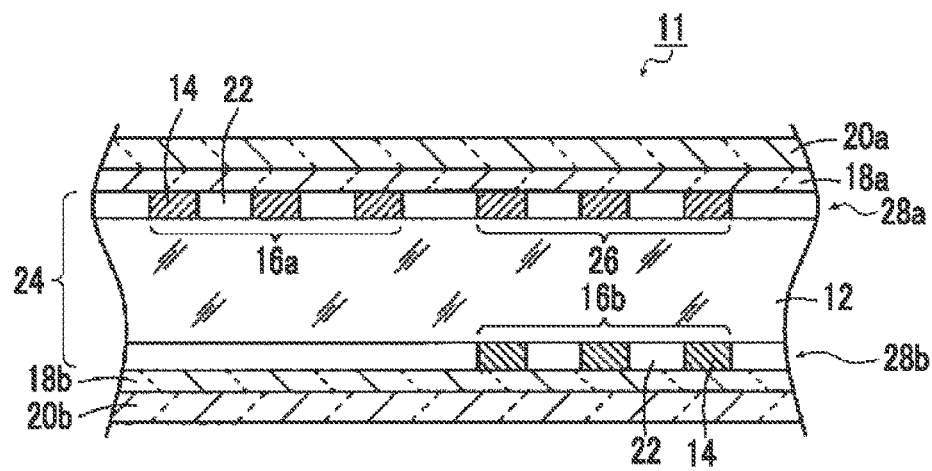
FIG. 3 is a schematic partial cross-sectional view of an example of a conductive film according to a second embodiment of the present invention.

FIG. 3 is a schematic partial cross-sectional view of an example of a conductive film according to a second embodiment of the present invention. The plan view of the conductive film according to the second embodiment shown in FIG. 3 is the same as the plan view of the conductive film according to the first embodiment shown in FIG. 1 and accordingly, will be omitted herein.

As shown in the drawing, a conductive film 11 according to the second embodiment includes a first conductive portion 16a and a dummy electrode portion 26 formed on one surface (on the upper side in FIG. 3) of the transparent substrate 12, a second conductive portion 16b formed on the other surface (on the lower side in FIG. 3) of the transparent substrate 12, a first protective layer 20a bonded to the substantially entire surface of the first conductive portion 16a and the dummy electrode portion 26 through a first adhesive layer 18a, and a second protective layer 20b boned to the substantially entire surface of the second conductive portion 16b through a second adhesive layer 18b.

In the conductive film 11, the first conductive portion 16a and the dummy electrode portion 26 each are formed of the plurality of thin metal lines 14 and both thereof are formed as a conductive layer 28a on one surface (on the upper side in FIG. 3) of the transparent substrate 12, and the second conductive portion 16b is formed of the plurality of thin metal lines 14 and is formed as a conductive layer 28b on the other surface (on the lower side in FIG. 3) of the transparent substrate 12. Here, the dummy electrode portion 26 is formed on one surface (on the upper side in FIG. 3) of the transparent substrate 12 similarly to the first conductive portion 16a, and has the plurality of thin metal lines 14 similarly arranged at positions corresponding to the plurality of thin metal lines 14 of the second conductive portion 16b formed on the other surface (on the lower side in FIG. 3), as shown in the drawing.

The dummy electrode portion 26 is separated from the first conductive portion 16a by a predetermined distance, and is in the state of being electrically insulated from the first conductive portion 16a.

In the conductive film 11 according to the present embodiment, the dummy electrode portion 26 formed of the plurality of thin metal lines 14 corresponding to the plurality of thin metal lines 14 of the second conductive portion 16b formed on the other surface (on the lower side in FIG. 3) of the transparent substrate 12 is formed on one surface (on the upper side in FIG. 3) of the transparent substrate 12. Therefore, scattering due to the thin metal lines on the one surface (on the upper side in FIG. 3) of the transparent substrate 12 can be controlled, and it is thus possible to improve visibility of electrode.

Here, the first conductive portion 16a and the dummy electrode portion 26 of the conductive layer 28a have a wiring pattern 24 having a mesh shape which is formed by the thin metal lines 14 and opening portions 22. The second conductive portion 16b of the conductive layer 28b has a wiring pattern 24 having a mesh shape which is formed by the thin metal lines 14 and opening portions 22, similarly to the first conductive portion 16a. As described above, the transparent substrate 12 is formed of an insulating material, and the second conductive portion 16b is in the state of being electrically insulated from the first conductive portion 16a and the dummy electrode portion 26.

In addition, the first and second conductive portions 16a and 16b and the dummy electrode portion 26 each can be formed of the same material as the conductive portion 16 of the conductive film 10 shown in FIG. 2 in the same manner.

The first protective layer 20a is bonded to the substantially entire surface of the conductive layer 28a formed of the first conductive portion 16a and the dummy electrode portion 26 through the first adhesive layer 18a so as to cover the thin metal lines 14 of the first conductive portion 16a and the dummy electrode portion 26.

Further, the second protective layer 20b is bonded to the substantially entire surface of the conductive layer 28b formed of the second conductive portion 16b through the second adhesive layer 18b so as to cover the thin metal lines 14 of the second conductive portion 16b.

Here, the first adhesive layer 18a and the second adhesive layer 18b each can be similarly formed of the same material as the adhesive layer 18 of the conductive film 10 shown in FIG. 2, and the material of the first adhesive layer 18a may be the same as or different from the material of the second adhesive layer 18b.

Further, the first protective layer 20a and the second protective layer 20b each can be similarly formed of the same material as the protective layer 20 of the conductive film 10 shown in FIG. 2, and the material of the first protective layer 20a may be the same as or different from the material of the second protective layer 20b.

Both the refractive index n2 of the first protective layer 20a and the refractive index n3 of the second protective layer 20b are values equal or close to that of the refractive index n0 of the transparent substrate 12, similarly to the protective layer 20 of the conductive film 10 according to the first embodiment. In this case, both the relative refractive index nr2 of the transparent substrate 12 with respect to the first protective layer 20a and the relative refractive index nr3 of the transparent substrate 12 with respect to the second protective layer 20b are values approximate to 1. Here, the definitions of the refractive index and the relative refractive index are the same as the definitions in the first embodiment. Accordingly, the relative refractive index nr2 of the transparent substrate 12 with respect to the first protective layer 20a is defined as nr2=(n2/n0), and the relative refractive index nr3 of the transparent substrate 12 with respect to the second protective layer 20b is defined as nr3=(n3/n0).

Here, similarly to the above-mentioned relative refractive index nr1, the range of the relative refractive index nr2 and the relative refractive index nr3 is preferably in a range equal to or greater than 0.86 and equal to or less than 1.15, and more preferably in a range equal to or greater than 0.91 and equal to or less than 1.08.

By limiting the range of the relative refractive index nr2 and the relative refractive index nr3 as the above-mentioned range, moiré visibility can be further improved, in a manner similar to that of the limitation of the range of the relative refractive index nr1.

Figures 4A, 4B:
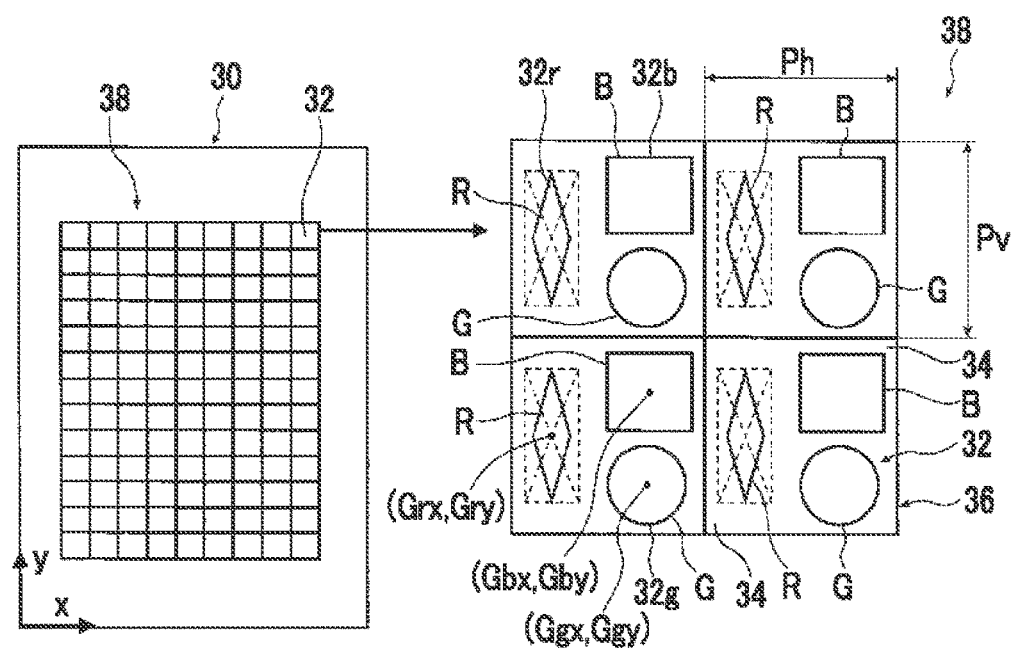
FIGS. 4A and 4B are respectively schematic explanatory diagrams illustrating an example of a part of pixel array patterns of a display unit using the conductive film according to the present invention.

The conductive film 10 according to the first embodiment and the conductive film 11 according to the second embodiment of the present invention are applied to, for example, a touch panel of a display unit 30 (display section), of which a part is schematically shown in FIG. 4A. From at least one point of view, each film has the wiring pattern that is optimized in terms of moiré visibility with respect to the pixel array pattern of the display unit 30, specifically, the sub-pixel array patterns (refer to FIG. 4B) of the respective colors. In the present invention, the wiring pattern, which is optimized in terms of moiré visibility with respect to the pixel array pattern (the BM pattern) including the sub-pixel array patterns with different colors, refers to a wiring pattern or a group of two or more wiring patterns making moiré not perceived by human visual sensation with respect to a predetermined pixel array pattern, from at least one point of view. In the present invention, a group of two or more wiring patterns optimized may be ranked, from a wiring pattern making moiré most difficult to be perceived to a wiring pattern making moiré somewhat difficult to be perceived, so as to determine one wiring pattern which makes moiré most difficult to be perceived.

It should be noted that the optimization of moiré visibility of the wiring pattern with respect to a predetermined pixel array pattern including the sub-pixel array patterns with different colors will be described later.

The conductive film according to the present invention basically has the above-mentioned configuration.

FIGS. 4A and 4B are respectively a schematic explanatory diagram illustrating an example of a part of pixel array patterns of a display unit using the conductive film according to the present invention, and a partially enlarged view of the part.

As shown in FIG. 4A, the display unit 30 has a plurality of pixels 32 arranged in a matrix shape to constitute a predetermined pixel array pattern. As shown in FIG. 4A, each pixel 32 has a configuration in which three sub-pixels (a red sub-pixel 32r, a green sub-pixel 32g, and a blue sub-pixel 32b) are arranged in a horizontal direction.

In the present invention, it is necessary for the pixel array pattern of the display unit to satisfy any of the following three conditions: a condition in which at least two sub-pixels among a plurality of sub-pixels in a single pixel, the three sub-pixels in the example shown in the drawing, have different shapes; a condition in which cycles of sub-pixel array patterns formed by arrays each corresponding to at least two sub-pixels among a plurality of (three) sub-pixels in a single pixel are different; or a condition in which a plurality of (three) sub-pixels in a single pixel is not lined up in one direction. In addition, in the present invention, the cycles of the sub-pixel array patterns, that is, the cycles of the sub-pixels (color filters) also include a cycle of sub-pixels in a single pixel.

In the example shown in FIG. 4B, each sub-pixel 32r has a rhomboid shape that is vertically long in the y (vertical) direction in the drawing, and is disposed on the left side of each square-shaped pixel 32 in the drawing, each sub-pixel 32g has a circular shape, and is disposed on the lower right side of the pixel 32 in the drawing, and each sub-pixel 32b has a rectangular shape (square shape), and is disposed on the upper right side of the pixel 32 in the drawing. In the display unit 30 shown in FIGS. 4A and 4B, a pixel array pattern 38 corresponds to a case where forms of three sub-pixels 32r, 32g, and 32b within a single pixel are different such that intensities thereof are different, and corresponds to a case where a plurality of (three) sub-pixels in a single pixel is not lined up in a single direction.

In the example shown in the drawing, the array pitch (horizontal pixel pitch Ph) of the pixels 32 in the horizontal direction and the array pitch (vertical pixel pitch Pv) of the pixels 32 in the vertical direction are substantially equal to each other, and are referred to as a pixel pitch Pd. That is, a region, which is formed of the three sub-pixels 32r, 32g, and 32b of a single pixel 32, and a pixel region 36, which is formed of a black matrix (BM) 34 (pattern material) surrounding the sub-pixels 32r, 32g, and 32b, have square shapes. It should be noted that the pixel region 36 corresponds to a single pixel 32, and therefore the pixel region 36 is hereinafter also referred to as a pixel.

It should be noted that the pixel pitch Pd (the horizontal or vertical pixel pitch Ph or Pv) may have any value if it is a pitch corresponding to a resolution of the display unit 30, and may be, for example, a pitch in a range of 84 µm to 264 µm.

Figure 5A:
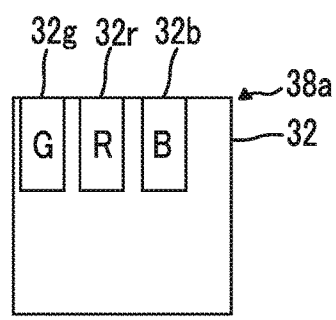
FIG. 5A is a schematic explanatory diagram illustrating an example of pixels constituting a pixel array pattern in which forms and cycles of three sub-pixels are the same.

In the examples shown in the drawing, the shapes of the sub-pixels 32r, 32g, and 32b within one pixel are respectively a rhomboid, a circle, and a rectangle. However, the present invention is not limited to this, and the shapes may be any shapes if there is not provided a pixel array pattern 38a, that is, if at least one of the above-mentioned three conditions is satisfied. In the pixel array pattern 38a, three sub-pixels having the same forms shown in FIG. 5A are lined up in the horizontal direction of the drawing, each pixel 32 is repeated in the horizontal direction and the vertical direction, and the cycles and intensities of the sub-pixels (color filters) are the same for the three sub-pixels of RGB.

For example, the sub-pixels (color filters) 32r, 32g, and 32b having opening shapes called a pin tile structure shown in FIGS. 5B to 5D may be used, and the sub-pixels (color filters) 32r, 32g, and 32b having opening shapes shown in FIG. 8A to be described later may be used. In addition, there may be provided sub-pixel array patterns each of which is formed of the sub-pixels 32r, 32g, and 32b.

Figure 5C:
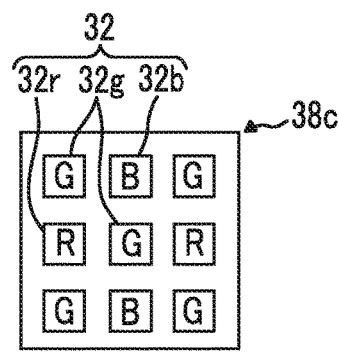
FIGS. 5B to 5D are schematic explanatory diagrams respectively illustrating examples of units constituting pixel array patterns, in which at least one of shapes or cycles of three sub-pixels are different, according to the present invention.
Figure 5B:
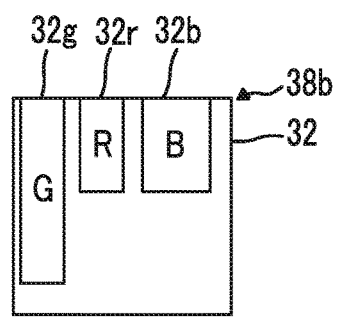

As shown in FIG. 5B, the forms of the three sub-pixels 32r, 32g, and 32b of the pixel 32 may be different (the shapes may be rectangles, but the sizes thereof may be different). This case corresponds to the case where the intensities thereof are different. In this case, it can be said that the cycles of the sub-pixels are the same.

That is, in the example shown in FIG. 5B, the pixel array pattern 38b is formed such that each pixel is formed of the three sub-pixels 32r, 32g, and 32b having different forms. Any of the cycles of the respective sub-pixel array patterns of the three sub-pixels 32r, 32g, and 32b is the same as the cycle of the pixel array pattern 38b.

It should be noted that in the present invention, the condition, in which the forms of the sub-pixels are different, is defined to include not only a case where the shapes of the sub-pixels are different but also a case where the sizes of the sub-pixels are different.

As shown in FIG. 5C, even when the forms of the three sub-pixels 32r, 32g, and 32b are the same, a repetition cycle (the cycle of the sub-pixel array pattern) of the sub-pixels 32g may be different from repetition cycle of the sub-pixels 32r and 32b. In this example, the cycle of the sub-pixels 32g is a half of the cycle of the sub-pixels 32r and 32b. In this case, it can be said that the intensities of the sub-pixels are the same.

That is, in the example shown in FIG. 5C, a pixel array pattern 38c is formed such that each pixel 32 is formed of four sub-pixels including the two sub-pixels 32g and the sub-pixels 32r and 32b. Either of the cycles of the respective sub-pixel array patterns of the sub-pixels 32r and 32b is the same as the cycle of the pixel array pattern 38b. The cycle of the sub-pixel array pattern of the sub-pixels 32g is a half of the cycle of the pixel array pattern 38b.

Figure 5D:
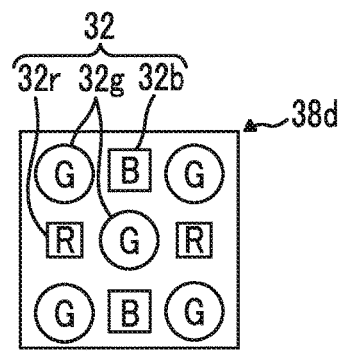

As shown in FIG. 5D, the repetition cycle (the cycle of the sub-pixel patterns) and the form (both the shape and the size) of the sub-pixels 32g may be different from those of the sub-pixels 32r and 32b. This case corresponds to the case where both the cycles and the intensities of the sub-pixels are different.

That is, in the example shown in FIG. 5D, in a manner similar to the example shown in FIG. 5C, a pixel array pattern 38d is formed such that each pixel 32 is formed of four sub-pixels including the two sub-pixels 32g and the sub-pixels 32r and 32b. Either of the cycles of the respective sub-pixel array patterns of the sub-pixels 32r and 32b is the same as the cycle of the pixel array pattern 38b. The cycle of the sub-pixel array pattern of the sub-pixels 32g is a half of the cycle of the pixel array pattern 38b.

From the above description, the sub-pixel array patterns of the sub-pixels 32r, 32g, and 32b of the pixels 32 shown in FIGS. 5A to 5D can be defined as follows.

It should be noted that opening shapes of the sub-pixels 32r, 32g, and 32b are various. Therefore, in the present invention, like the sub-pixel 32r shown in FIG. 4B, the outermost periphery of the opening of each sub-pixel is surrounded by a rectangle, and a barycenter of the rectangle including the opening is defined as a barycenter of the opening.

As shown in FIG. 4B, the barycenter positions of the openings of the rectangular shapes of the three sub-pixels 32g, 32r, and 32b are respectively referred to as (Ggx, Ggy), (Grx, Gry), and (Gbx, Gby) on the xy coordinates, and the pixel pitch is Pd. In the example shown in FIG. 5A, regarding each pixel having the sub-pixels 32g, 32r, and 32b, (n−1)th and n-th pixels, which are adjacent in the x direction, and (m−1)th and m-th pixels, which are adjacent in the y direction, satisfy the following Expression (4).

$Ggx(n)=Ggx(n-1)+Pd$ (x direction)

$Ggy(m)=Ggy(m-1)+Pd$ (y direction)

$Grx(n)=Ggx(n)+Pd/3=Grx(n-1)$ $+Pd$ (x direction)

$Gry(m)=Gry(m-1)+Pd$ (y direction)

$Gbx(n)=Grx(n)+Pd/3=Ggx(n)+2Pd/3$ $=Gbx(n-1)+Pd$ (x direction)

$Gby(m)=Gry(m-1)+Pd$ (y direction) \hfill (4)

It should be noted that, in the present invention, a tolerance of the pixel pitch Pd is 10% thereof, and thus the pixel pitch may deviate by 10%.

For example, the positions of the sub-pixels 32r and 32b with respect to the sub-pixel 32g can be represented by the following Expression (5).

$Grx(n)=Ggx(n)+Pd/3(1-1/10) \sim Ggx(n)$ $+Pd/3(1+1/10)$ $=Ggx(n)+3Pd/10 \sim Ggx(n)$ $+11Pd/30$ $Gry(m)=Gry(m-1)+Pd(1-1/10)$ $\sim Gry(m-1)+Pd(1+1/10)$ $=Gry(m-1)+9Pd/10 \sim Gry(m-1)$ $+11Pd/10$ $Gbx(n)=Ggx(n)+2Pd/3(1-1/10)$ $\sim Ggx(n)+2Pd/3(1+1/10)$ $=Ggx(n)+3Pd/5 \sim Ggx(n)$ $+11Pd/15$ $Gby(m)=Gby(m-1)+Pd(1-1/10)$ $\sim Gby(m-1)+Pd(1-1/10)$ $=Gby(m-1)+9Pd/10$ $\sim Gby(m-1)+11Pd/10$ \hfill (5)

The above-mentioned expression is the conventional case shown in FIG. 5A. Therefore, in the sub-pixel array pattern of the present invention, when the sub-pixel 32g and the sub-pixels 32r and 32b are lined up in this order in the x direction, the above-mentioned Expression (5) is not satisfied, and an inequation represented in the following Expression (6) is satisfied.

$Ggx(n)+3Pd/10<Grx(n)<Ggx(n)$ $+11Pd/30$ $Gry(m-1)+9Pd/10<Gry(m)<Gry(m-1)$ $+11Pd/10$ $Ggx(n)+3Pd/5<Gbx(n)<Ggx(n)+11Pd/15$ $Gby(m-1)+9Pd/10<Gby(m)<Gby(m-1)$ $+11Pd/10$ \hfill (6)

From the above description, the sub-pixel array pattern of the present invention is in at least one of: a condition in which the forms of the sub-pixels for at least two colors different from each other among the plurality of colors such as RGB are different; or a condition in which the cycles of the sub-pixel array patterns formed by arrays of the sub-pixels of the respective colors are different. In this case, assuming that the pixel pitch of the pixel array pattern is Pd, regarding any two colors of the plurality of colors such as RGB, it is preferable that any one of the following relationships is satisfied: a difference between the position of the barycenter of the sub-pixel of one color and the position of the barycenter of the sub-pixel of the other color in a single direction, for example, the x direction is less than 3Pd/10; the difference is greater than 11Pd/30 and less than 3Pd/5; and the difference is greater than 11Pd/15. Alternatively, regarding any single color of the plurality of colors, it is preferable that either one of the following relationships is satisfied: a difference between the position of the barycenter of the sub-pixel of the single color and the position of the barycenter of the sub-pixel of the single color of the adjacent pixel in one direction, for example, a direction perpendicular to the single direction, for example, the y direction is less than 9Pd/10; and the difference is greater than 11Pd/10.

As can be clearly seen from FIG. 4B, the pixel array pattern 38 formed of the sub-pixels 32r, 32g, and 32b of each of the plurality of pixels 32 may be defined by a BM pattern of BMs 34 respectively surrounding the sub-pixels 32r, 32g, and 32b. Moiré, which occurs when the conductive film 10 or 11 is superposed on the display unit 30, is caused by interference between the BM pattern of the BMs 34 of the display unit 30 and the wiring pattern 24 of the conductive film 10 or 11. Therefore, precisely, the BM pattern is an inverted pattern of the pixel array pattern 38, but here, these patterns are regarded as the same patterns.

For example, the conductive film 10 or 11 may be disposed on a display panel of the display unit 30 having the BM pattern 38 formed by the BMs 34 that defines the above-mentioned sub-pixel array pattern of RGB. In this case, the wiring pattern 24 of the conductive film 11 is optimized in terms of moiré visibility with respect to the BM (pixel array) pattern 38 including the sub-pixel array patterns of RGB. Therefore, there is almost no interference in spatial frequency between the array cycle of the pixels 32 and the wiring array of the thin metal lines 14 of the conductive film 10 or 11, and occurrence of moiré is suppressed.

It should be noted that the display unit 30 shown in FIG. 4A may be formed as a display panel such as a liquid crystal panel, a plasma panel, an organic EL panel, or an inorganic EL panel.

Figure 6:
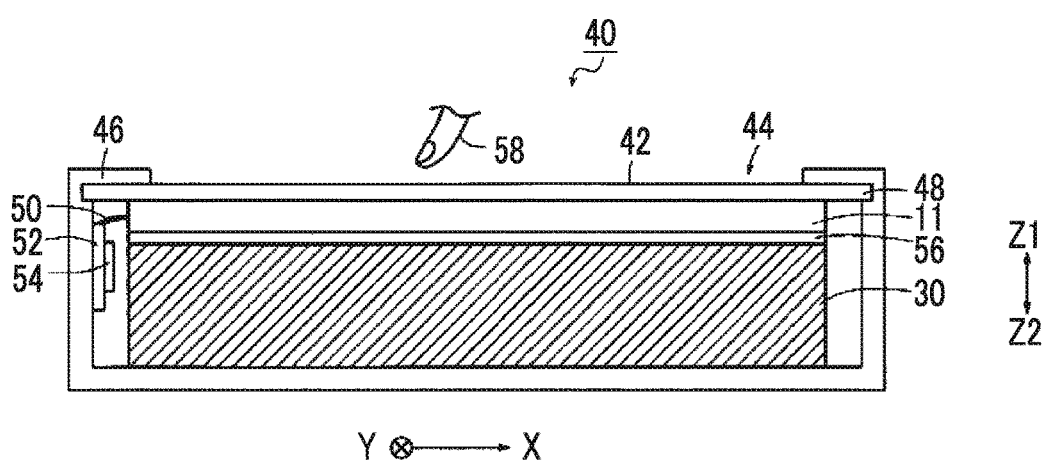
FIG. 6 is a schematic sectional view of one example of a display device provided with the conductive film shown in FIG. 3.

Next, a display device, in which the conductive film according to the present invention is incorporated, will be described with reference to FIG. 6. In FIG. 6, a projected capacitive type touch panel, in which the conductive film 11 according to the second embodiment of the present invention is incorporated, will be described as a representative example of a display device 40, but it is needless to say that the present invention is not limited to this example.

As shown in FIG. 6, the display device 40 includes the display unit 30 (refer to FIG. 4A) that can display a color image and/or a monochrome image, a touch panel 44 that detects a contact position on an input surface 42 (located on the side as directed by the arrow Z1), and a housing 46 in which the display unit 30 and the touch panel 44 are housed. A user is able to access the touch panel 44 through a large opening provided in one face (on the side as directed by the arrow Z1) of the housing 46.

The touch panel 44 includes not only the conductive film 11 (refer to FIGS. 1 and 3) described above but also a cover member 48 stacked on one face (on the side as directed by the arrow Z1) of the conductive film 11, a flexible substrate 52 electrically connected to the conductive film 11 through a cable 50, and a detection control unit 54 disposed on the flexible substrate 52.

The conductive film 11 is bonded to one face (on the side directed by the arrow Z1) of the display unit 30 through an adhesive layer 56. The conductive film 11 is disposed on the display screen such that the other main face side (second conductive portion 16b side) is opposite to the display unit 30.

The cover member 48 functions as the input surface 42 by covering one face of the conductive film 11. In addition, by preventing a contact member 58 (for example, a finger or a stylus pen) from coming into direct contact with the conductive film 11, it is possible to suppress the occurrence of a scratch, adhesion of dust, and the like, and thus it is possible to unit. stabilize conductivity of the conductive film 11.

The material of the cover member 48 may be, for example, glass or a resin film. One face (on the side as directed by the arrow Z2) of the cover member 48 may be coated with silicon oxide or the like, and may be adhered to one face (on the side as directed by the arrow Z1) of the conductive film 11. Further, in order to prevent damage due to rubbing or the like, the conductive film 11 and the cover member 48 may be configured to be bonded to each other.

The flexible substrate 52 is an electronic substrate having flexibility. In the example shown in this diagram, the flexible substrate 52 is fixed to an inner wall of the housing 46, while the position of the substrate may be varied. The detection control unit 54 constitutes an electronic circuit that catches a change in the capacitance between the contact member 58 and the conductive film 11 and detects the contact position (or the approach position) when the contact member 58 as a conductor is brought into contact with (or comes closer to) the input surface 42.

The display device, to which the conductive film according to the present invention is applied, basically has the above-mentioned configuration.

Next, in the present invention, processes of evaluating moiré visibility on a wiring pattern of the conductive film with respect to a predetermined pixel array (BM) pattern of the display device and performing optimization will be described. That is, a description will be given of the processes of evaluating and determining a wiring pattern which is optimized such that moiré with respect to a predetermined pixel array (BM) pattern of the display device is not perceived by human visual sensation, from at least one point of view, in the conductive film according to the present invention.

Figure 7:
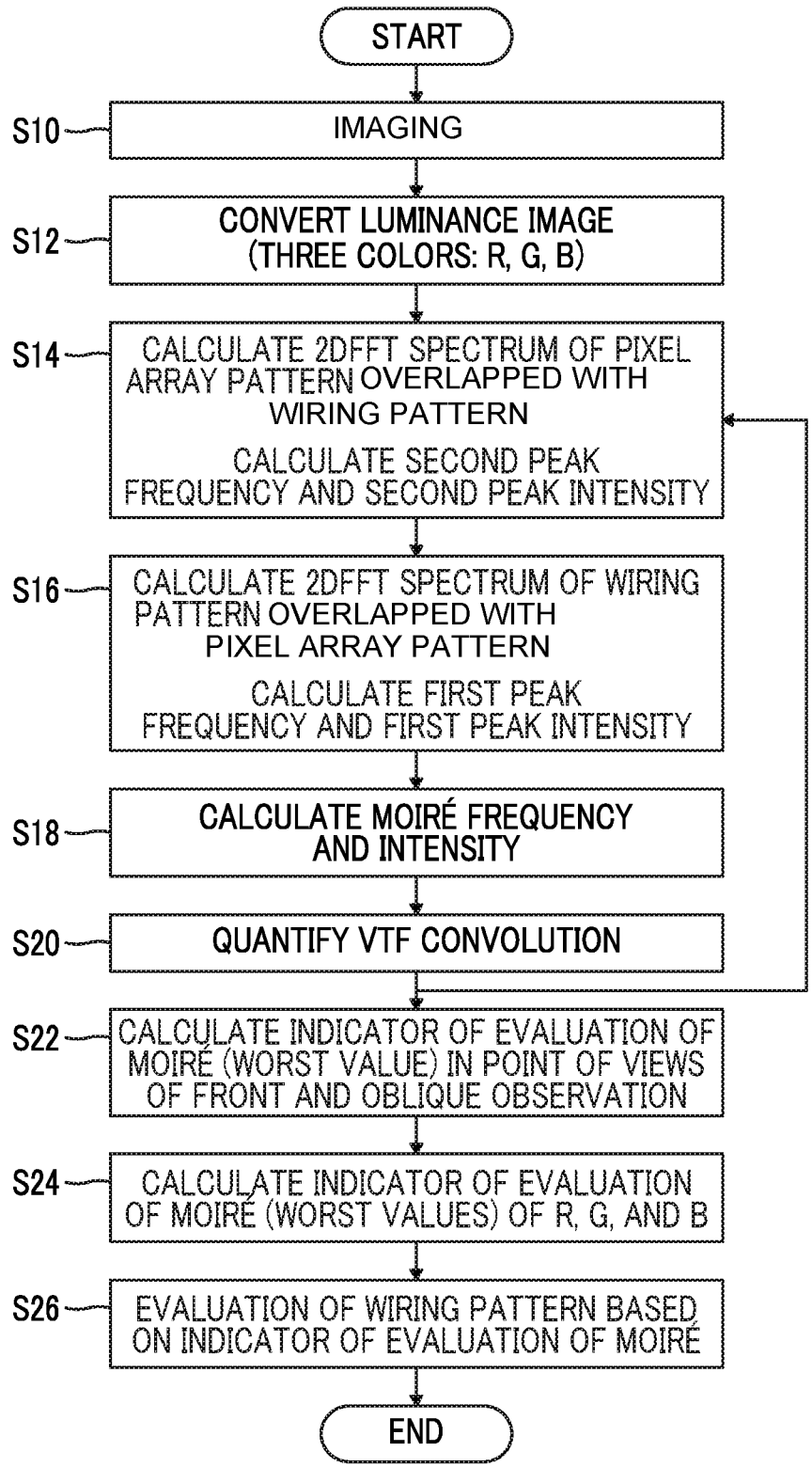
FIG. 7 is a flowchart illustrating an example of a method of evaluating wiring on the conductive film according to the present invention.

FIG. 7 is a flowchart illustrating an example of a method of evaluating the conductive film of the present invention.

In the method of evaluating a wiring pattern of the conductive film of the present invention, moirés (frequencies and intensities) of the respective colors with frequencies equal to or less than a highest frequency of moirés defined by the display resolution of the display unit are collected on the basis of the frequencies and the intensities of moirés which are obtained through frequency analysis using fast Fourier transforms (FFT) of the wiring pattern of the conductive film and the sub-pixel array patterns of the respective colors of the plurality of colors (for example RGB) of the BM (pixel array) patterns of the display unit of the display device, evaluation values of moirés of the respective colors are obtained by applying human visual response characteristics to intensities of moirés at the frequencies of the collected moirés of the respective colors in accordance with the observation distance, an indicator of evaluation of moirés is calculated on the basis of evaluation values of a plurality of moirés, and a wiring pattern, which satisfies a condition where the calculated indicator of evaluation of moirés is set in advance, is evaluated and determined as a wiring pattern which is optimized such that moirés are not visually perceived. In the method according to the present invention, FFT is generally used for the frequencies and intensities of moirés, and the following processes are defined because the frequency and intensities of a target may greatly vary depending on the way of usage.

In the present invention, first, it is preferable that the following is considered: the display screen of the display unit of the display device is observed from one point of view in the front. In this case, the present invention is not limited to this, but the display screen may be observed from any point of view if moiré visibility can be improved in a case where observation is performed from at least one point of view.

As might be expected, in the present invention, it is preferable that the following cases are considered: a case where the display screen is observed from the front; and a case where the display screen is obliquely observed.

Hereinafter, as shown in FIG. 7, the following item will be described: in consideration of the front observation and the oblique observation, imaging is performed for each color on the BM (pixel array) pattern which has sub-pixels with three colors such as RGB.

In the method according to the present invention, first, in a process 1, RGB luminance pixel information (normalized luminance image data) is acquired from a captured image.

That is, as shown in FIG. 7, first, in step S10, an image of the display screen (an image of the sub-pixel array pattern of each color) of the display unit of the display device is captured for each color of RGB.

In step S10, first, the display unit 30 of the display device 40 is turned on for each color of RGB. At this time, it is preferable that the luminance is maximized in a range in which it can be obtained through setting change of a light emitting side (display device 40).

Subsequently, an image of the sub-pixels is captured in a state where the sub-pixels of each color of RGB are lit on. That is, an image of transmitted light of each of the sub-pixels (RGB color filters) 32r, 32g, and 32b of the pixel array pattern 38 of the display unit 30 shown in FIG. 8A is captured by using a microscope. In the imaging, it is preferable that white balance of a microscope is adjusted to white color of Macbeth chart.

Figure 8A:
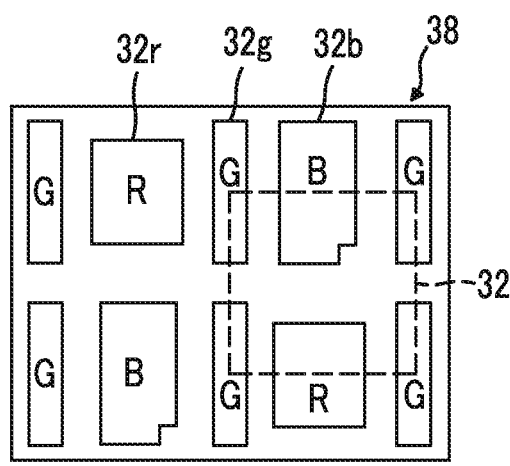
FIG. 8A is a schematic explanatory diagram illustrating an example of sub-pixel array patterns of a display unit, to which the conductive film according to the present invention is applied, in a lighting state.

In the pixel array pattern 38 shown in FIG. 8A, each G sub-pixel 32g is an elongated rectangle, each R sub-pixel 32r is a rectangle which has a larger width and a smaller length than the C sub-pixel 32g, and each B sub-pixel 32b is a rectangle which has the same width as the R sub-pixel 32r and the same length as the G sub-pixel 32g and has a small square notch on the lower right side thereof in the drawing. The C sub-pixels 32g are disposed to be interposed between the R sub-pixels 32r and the B sub-pixels 32b, and have a repetition cycle which is a half of repetition cycles of the R sub-pixels 32r and the B sub-pixels 32b. In the pixel array pattern 38, a single pixel 32 is a square region surrounded by the dotted line.

A microscope, a lens, a camera used in imaging are not particularly limited, but, for example, STM6 (manufactured by OLYMPUS Corp.) can be used as the microscope, UMPlanFlx10 (manufactured by OLYMPUS Corp.) can be used as the lens, and QIC-F-CLR-12-C (manufactured by Linkam Scientific Instruments Corp.) can be used as the camera. Here, as the imaging conditions, for example, a gain can be set to 1.0, and white balance (G, R, B) can be set to (1.00, 2.17, 1.12). In addition, it is preferable that the captured image is subjected to shading correction.

Subsequently, in step S12, on the basis of captured image data of the captured image of the sub-pixel array pattern of each color, a luminance value of each color (RGB) is converted, and luminance data (total three data pieces) of RGB is created on the basis of G=1.0.

Assuming that red image data is R, green image data is G, blue image data is B, and the luminance value is Y, for conversion from the captured image into the luminance value, Y (luminance value) is calculated through the following conversion Expression (1), and R, G, and B color filter images (luminance ratio images) are created.

$$Y=0.300R+0.590G+0.110B \quad (1)$$

The maximum value of the C sub-pixel (color filter) image (luminance ratio image) obtained in such a manner is 1.0 (=0.25*255), that is, the luminance images of the R, G, and B sub-pixels as references are normalized. Thereby, a normalized luminance image (image data) of each of the RGB sub-pixels is created.

Figure 8B:
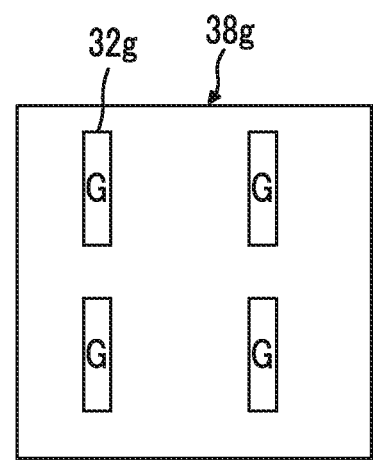
FIG. 8B is a schematic explanatory diagram illustrating a sub-pixel array pattern of G color of FIG. 8A.
Figure 8C:
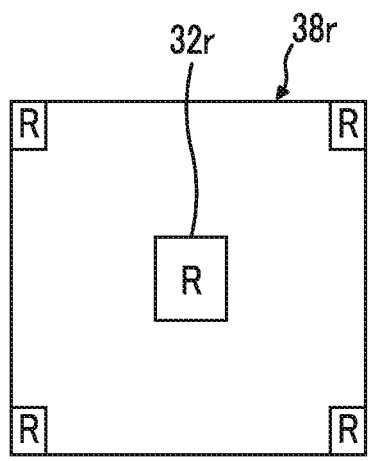
FIG. 8C is a schematic explanatory diagram illustrating a sub-pixel array pattern of R color of FIG. 8A.
Figure 8D:
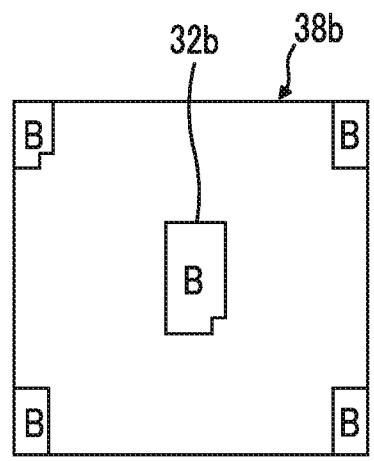
FIG. 8D is a schematic explanatory diagram illustrating a sub-pixel array pattern of B color of FIG. 8A.

FIGS. 8B, 8C, and SD respectively show C, R, and B normalized luminance images 38g, 38r, and 38b obtained in such a manner.

A method of acquiring RGB luminance pixel information (normalized luminance image data) by capturing images of the RGB sub-pixel array patterns of the display unit 30 is not limited to this, and spectra of the sub-pixel images may be measured using a spectrometer, and may be luminance-converted on the basis of the measured spectrum data.

For example, as described below, RGB sub-pixel (BM) input data may be created using the spectrometer.

Figure 9:
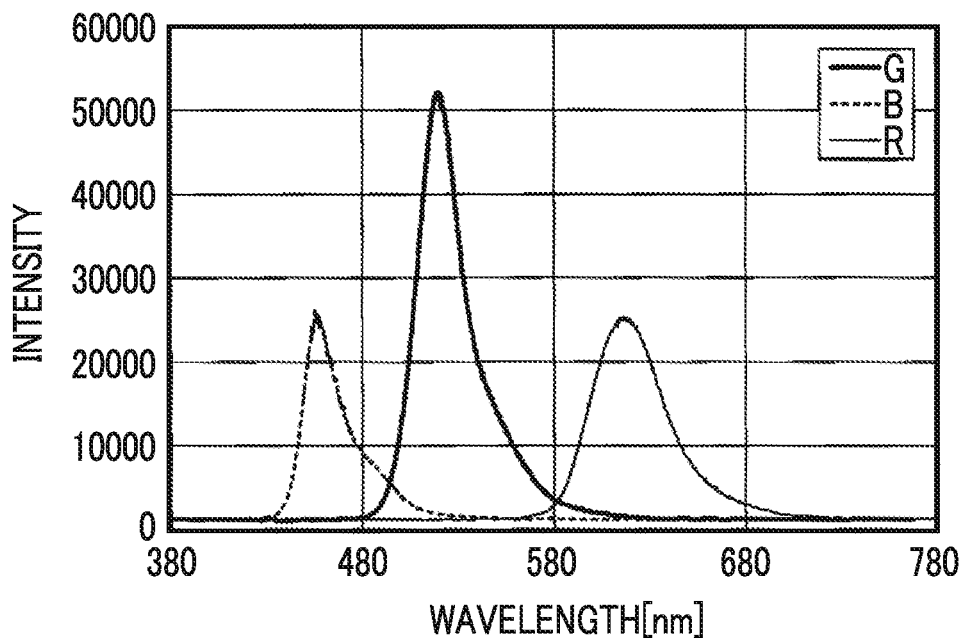
FIG. 9 is a graph illustrating an example of spectra of RGB sub-pixels of the display unit to which the conductive film according to the present invention is applied.

1. If each of the RGB sub-pixels of the display unit 30 is respectively lit on for each color and is measured through the spectrometer, for example, it is possible to obtain spectrum data shown in FIG. 9.

2. Subsequently, images of the BMs at the time of lighting on for each color of RGB are captured through the microscope, and a mask image is created on the basis of image data of the respective captured images obtained. In a method of creating the mask image, in a case of the G channel, an average value of pixel sizes of the light-on BMs is calculated, and mask data is acquired when the average value is set to a threshold value. Then, the mask image is created.

Figure 10:
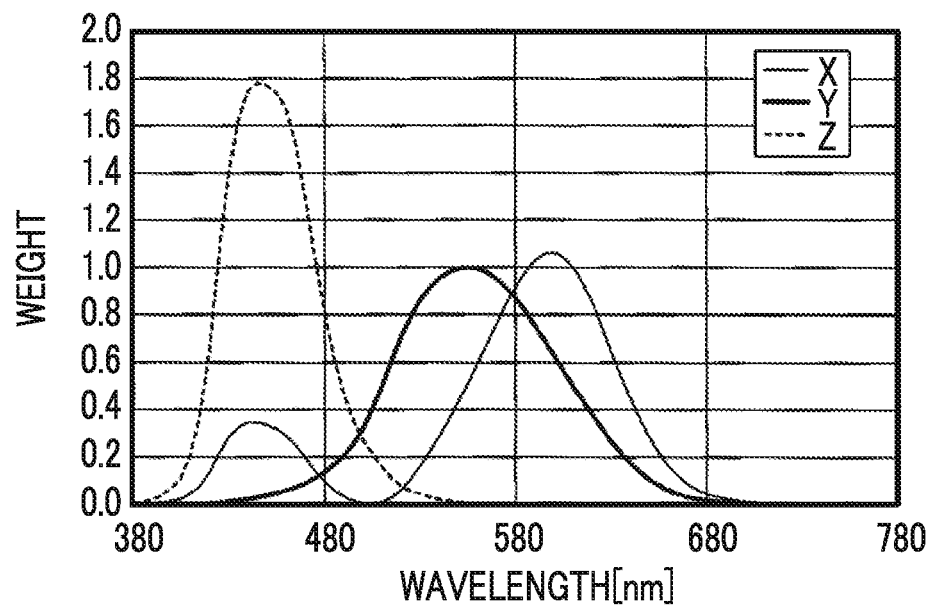
FIG. 10 is a graph illustrating an example of XYZ color matching functions applied to the present invention.

3. Subsequently, a location of 1 of (0, 1) mask data of the mask image obtained in the section 2 is replaced with an integral value through the XYZ color matching functions shown in FIG. 10 in the spectrum data obtained in the section 1. For example, if the input data of the G sub-pixel is intended to be created, a product (G×Y) between the spectrum data G of G shown in FIG. 9 and the spectrum data Y of the luminance Y of the XYZ color matching function shown in FIG. 10 may be acquired. In addition, if the input data of the B sub-pixel is intended to be created, a product (B×Y) between the spectrum data B of B shown in FIG. 9 and the spectrum data Y of the luminance Y of the XYZ color matching function shown in FIG. 10 may be acquired. Likewise, the input data of the R sub-pixel may be created. At this time, the calculated luminance Y is proportional to an opening area of the sub-pixels and the number of pixels included in a sensor of the spectrometer, and is therefore normalized by the number of pixels and the opening area. The reason for this is that a macro luminance can be regarded as a value which is obtained by multiplying the opening area of the sub-pixels by the number of pixels included in the sensor in a case where the sub-pixels are regarded as a set of infinitesimal light sources.

4. Subsequently, in the input data of the obtained RGB sub-pixels, the input data of R and B is normalized such that the maximum value of the input data of the G sub-pixel becomes 1.0.

In such a manner, it is possible to acquire RGB luminance pixel information (normalized luminance image data).

Next, in a process 2, a peak frequency and a peak intensity are calculated by performing two-dimensional fast Fourier transform (2DFFT (base 2)) on normalized luminance image data of the sub-pixels created in the process 1 (steps 10 and 12).

That is, as shown in FIG. 7, in step S14, Fourier spectrum is calculated by performing 2DFFT on the image data of the sub-pixel array pattern (BM pattern) of each color of the BM pattern 38 for each color of RGB.

In step S14, first, the normalized luminance image of each color obtained in the process 1 (step 10 and 12) is set at a resolution of 12700 dpi which is a high resolution through bilinear interpolation for each color, and an image size of the normalized luminance image is bicubic-converted into 109 pix (pixel)×109 pix (pixel). It should be noted that, if the resolution of the optical imaging system is given, it is possible to calculate the values in accordance with the resolution.

Subsequently, the normalized luminance image, of which the image size is 109 pix×109 pix, with the resolution of 12700 dpi is repeatedly copied by an integer multiple (183 times) approximate to an image size of 20000 pix×20000 pix for each color of RGB, and thereby luminance image data for moiré evaluation is created.

The peak frequency and the peak intensity are obtained by performing 2DFFT on the luminance image data for moiré evaluation obtained in such a manner. Here, the peak intensity is treated as an absolute value of the Fourier spectrum.

This process is repeatedly performed for each color of RGB. At this time, if all small intensities not contributing to moiré are used, calculation becomes complicated, and an effect of improvement in accuracy is saturated. Therefore, it is preferable to provide a threshold value on the basis of the intensity. For example, it is preferable to employ a value which is larger than −2.2 ($\log_{10}$ (intensity)>−2.2), as a common logarithm.

Figure 11A:
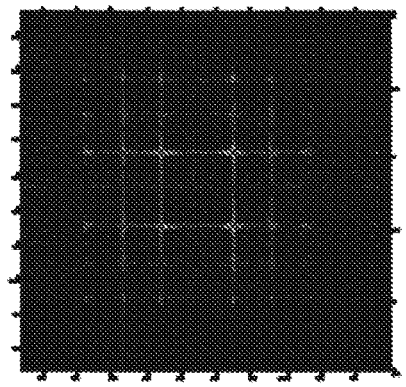
FIGS. 11A and 11B are diagrams illustrating intensity characteristics of two-dimensional Fourier spectra of respective transmittance image data pieces of the pixel array pattern shown in FIG. 8A and the wiring pattern shown in FIG. 1.

FIG. 11A shows an example of intensity characteristics of two-dimensional Fourier spectrum of the luminance image data (of the sub-pixel array pattern) of the G color obtained in such a manner.

Next, in a process 3, the peak frequency and the peak intensity are calculated by performing 2DFFT on the transmittance image data of the mesh-shaped wiring pattern.

That is, as shown in FIG. 7, in step S16, Fourier spectrum is calculated by performing 2DFFT on the transmittance image data of the mesh-shaped wiring pattern (mesh pattern) 24 of the conductive film 11.

In step S16, first, an image (transmittance image data) of the mesh pattern 24 is created. That is, the transmittance image data of the mesh-shaped wiring pattern 24 (thin metal line 14) (refer to FIG. 1) of the conductive film 11 is created and acquired. It should be noted that, in a case where the transmittance image data of the mesh pattern 24 is provided or stored in advance, the transmittance image data may be acquired from the provided or stored transmittance image data.

For example, as shown in FIG. 1, the mesh pattern 24 can be defined as a rhomboidal pattern in which the thin metal lines 14 for wiring are tilted at a predetermined angle, for example, an angle of less than 45° [deg] with respect to the horizontal line. However, as described above, the shape of each opening of the wiring pattern may be anything. For example, it is apparent that the shape may be a regular hexagon or a square lattice as shown in FIGS. 18B to 18D to be described later, and the square lattice may be a square lattice tilted at 45° [deg].

Further, when the transmittance image data of the mesh pattern 24 is created, the resolution is set to, for example, 12700 dpi which is the same as the resolution of the pixel array (BM) pattern 38. The size of the transmittance image data is defined such that the pixel size is set as, for example, an integer multiple of the size (for example, 109 pix×109 pix) of the mesh pattern 24 approximate to 20000 pix×20000 pix, similarly to the BM pattern 38.

Subsequently, by performing 2DFFT (base 2) processing on the respective transmittance image data pieces of the mesh pattern 24 created in such a manner, the peak frequency and the peak intensity of the plurality of spectrum peaks of the two-dimensional Fourier spectra of the respective transmittance image data pieces of the mesh pattern 24 are calculated. Here, the peak intensity is treated as an absolute value. For simplification of calculation, it is preferable that, for example, only a threshold value of the intensity greater than −2.0 as a common logarithm is treated.

Figure 11B:
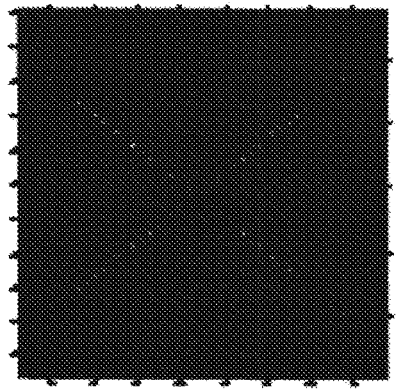

FIG. 11B shows an example of intensity characteristics of the two-dimensional Fourier spectra of the respective transmittance image data pieces of the mesh pattern 24 obtained in such a manner.

As described above, FIGS. 11A and 11B are respectively diagrams illustrating the intensity characteristics of the two-dimensional Fourier spectra of the respective transmittance image data pieces of the mesh pattern 24 and the luminance image data (of the sub-pixel array pattern) of the G color of the BM pattern 38.

In FIGS. 11A and 11B, white portions have high intensities, and indicates spectrum peaks. Therefore, from the results shown in FIGS. 11A and 11B, the peak frequencies and the peak intensities of spectrum peaks are calculated respectively for the mesh pattern 24 and the sub-pixel array patterns of the three colors such as RGB of the BM pattern 38. In other words, the peak frequencies are represented by the peak positions, that is, positions on frequency coordinates of the spectrum peaks in the intensity characteristics of the two-dimensional Fourier spectra of the mesh pattern 24 and the sub-pixel array patterns of the BM pattern 38 respectively shown in FIGS. 11A and 11B. In addition, the peak intensities are intensities of the two-dimensional Fourier spectra at the peak positions.

Here, the peak frequencies and the peak intensities of the spectrum peaks of the mesh pattern 24 and the sub-pixel array patterns of the BM pattern 38 are calculated and acquired in a manner similar to that of the following description. Hereinafter, summary thereof will be described.

Figure 12:
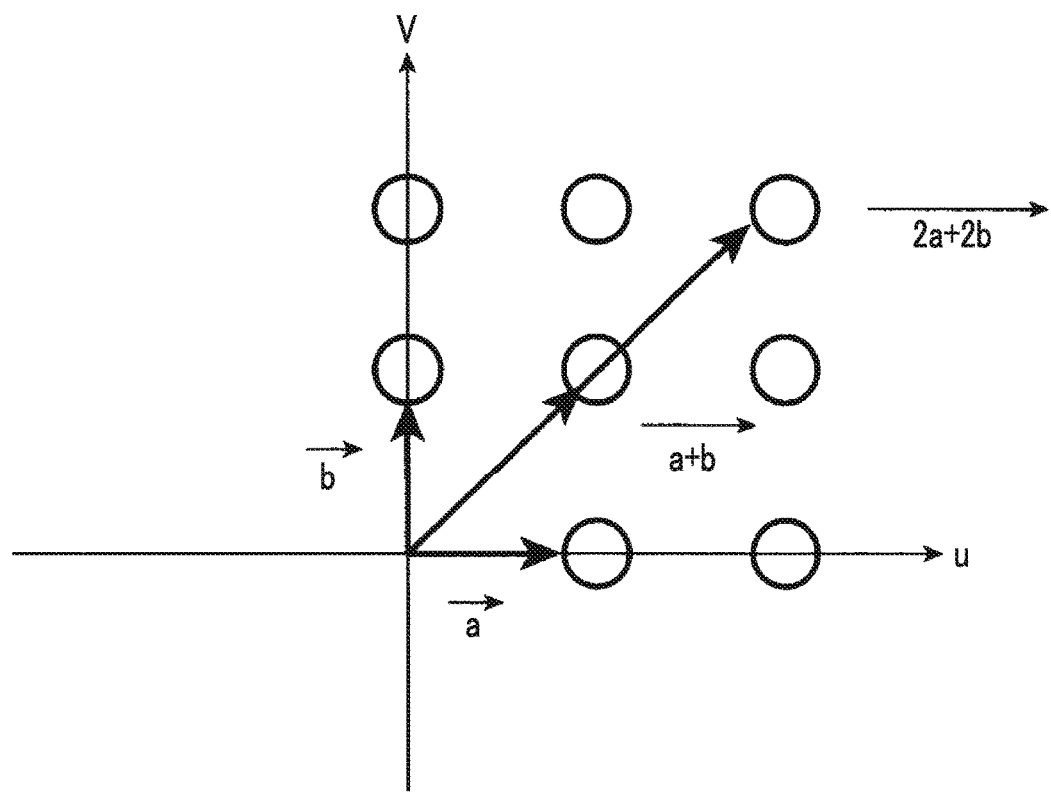
FIG. 12 is a graph illustrating a frequency peak position of the pixel array pattern of the display unit shown in FIG. 8A.

First, in the process of acquiring the peak frequencies, for peak calculation, the frequency peaks are obtained from basic frequencies of the mesh pattern 24 and the sub-pixel array patterns of the BM pattern 38. The reason for this is that, since the luminance image data and the transmittance image data for performing the 2DFFT processing are discrete values, the peak frequency depends on an inverse of the image size. As shown in FIG. 12, each frequency peak position can be represented by combination based on a bar and b bar as independent two-dimensional fundamental frequency vector components. Consequently, it is apparent that the obtained peak positions have a lattice shape.

Figure 13A:
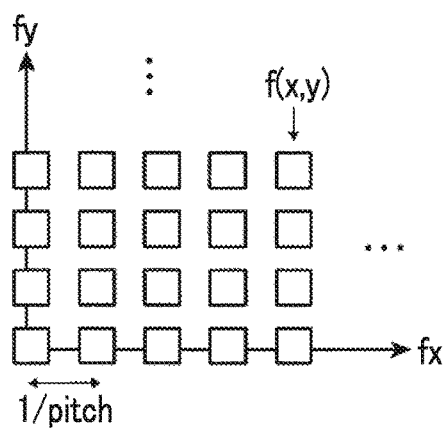
FIG. 13A is a graph a frequency peak position of an input pattern image, and Fig. B is a graph illustrating calculation of a peak intensity at the frequency peak position.

That is, as shown in FIG. 13A, the positions of the spectrum peaks of the mesh pattern 24 and the sub-pixel array patterns of the BM pattern 38 on the frequency coordinates fxfy, that is, the peak positions are given as positions of points having a lattice shape on the frequency coordinates fxfy in which an inverse (1/p (pitch)) of the pattern pitch is set as a lattice interval.

In addition, FIG. 12 is a graph illustrating the frequency peak positions in the case of the sub-pixel array pattern of the G color of the BM pattern 38, and the mesh pattern 24 can be obtained in a manner similar to that in the above description.

Figure 14A:
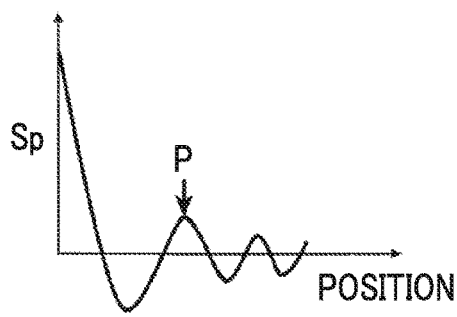
FIGS. 14A and 14B are respectively a graph in which exemplary intensity characteristics of two-dimensional Fourier spectrum are represented by a curve and a bargraph in which the intensity characteristics are represented by bars.
Figure 14B:
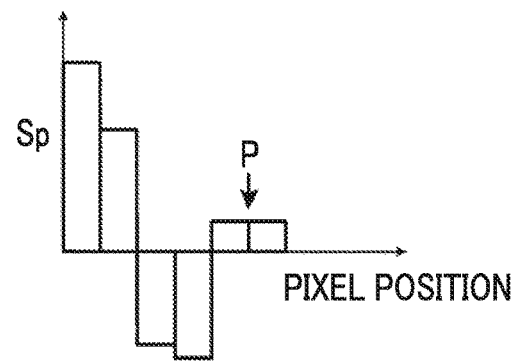

In contrast, in the process of acquiring the peak intensities, the peak positions are obtained by acquiring the peak frequencies, and thus the intensities (absolute values) of the two-dimensional Fourier spectra at the peak positions are obtained. At that time, FFT processing is performed on digital data, and thus in some cases, the peak position may be between a plurality of pixels. For example, when intensity (Sp) characteristics of the two-dimensional Fourier spectrum are represented by the curve (analog value) shown in FIG. 14A, intensity characteristics of the two-dimensional Fourier spectrum subjected to the digital processing are represented by a bargraph (digital values) shown in FIG. 14B. A peak P of the intensity of the two-dimensional Fourier spectrum shown in FIG. 14A is between two pixels in corresponding FIG. 14B.

Figure 13B:
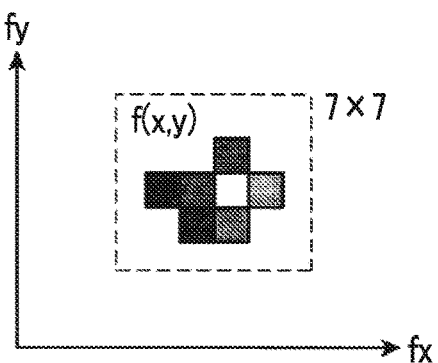

Accordingly, if the intensity present at the peak position is intended to be acquired, as shown in FIG. 13B, it is preferable that the peak intensity is the sum of the intensities (absolute values) having highest ranks at a plurality of points among spectrum intensities of a plurality of pixels within a region including a plurality of pixels around the peak position, for example, the sum of the intensities having highest ranks at five points among spectrum intensities of the pixels within a region of 7×7 pixels.

Here, it is preferable that the obtained peak intensity is normalized by the image area (image size). For example, it is preferable that the intensity is normalized by the above-mentioned image size (Parseval's theorem).

Next, in the process 4, a frequency and a intensity of moiré are calculated from the peak frequencies and the peak intensities of the sub-pixel array patterns of the respective colors of RGB obtained in the process 2 (step 14) and the peak frequency and the peak intensity of the mesh pattern 24 obtained in the process 3 (step 16).

Specifically, as shown in FIG. 7, in step S18, the frequencies and the intensities of moirés for respective colors are calculated from the peak frequencies and the peak intensities of both two-dimensional Fourier spectra of the mesh pattern 24 and the sub-pixel array patterns of the respective RGB colors of the BM pattern 38 respectively calculated in steps S14 and 16. Here, the peak intensities and the intensities of moirés are also treated as absolute values.

In real space, moiré is caused by multiplication between the image data of the mesh pattern 24 and the image data of the sub-pixel array pattern of each color of the BM pattern 38 (between the transmittance image data and the luminance image data). Thus, in frequency space, both image data pieces are subjected to convolution integration (convolution). However, in steps S14 and 16, the peak frequencies and the peak intensities of both two-dimensional Fourier spectra of the mesh pattern 24 and the sub-pixel array pattern of each color of the BM pattern 38 are calculated. Therefore, a difference (an absolute value of a difference) between both frequency peaks of the mesh pattern 24 and the sub-pixel array pattern of a single color of RGB is obtained, the obtained difference is set as a frequency of moiré, a product between two sets of vector intensities obtained by combining both is obtained, and the obtained product is set as an intensity (absolute value) of moiré.

The frequency of moiré and the intensity of moiré are obtained for each color of RGB.

Here, the difference between the frequency peaks of the intensity characteristics of both two-dimensional Fourier spectra of the mesh pattern 24 and the sub-pixel array pattern of each color of the BM pattern 38 respectively shown in FIGS. 11A and 11B corresponds to a relative distance between the peak positions of both frequency peaks on the frequency coordinates, in intensity characteristics obtained by superimposing the intensity characteristics of both two-dimensional Fourier spectra for each color.

A plurality of spectrum peaks of both two-dimensional Fourier spectra between the mesh pattern 24 and the sub-pixel array pattern of each color of the BM pattern 38 is present for each color. Therefore, a plurality of the differences between the frequency peaks which are values of the relative distances, that is, a plurality of the frequencies of moiré is obtained. Consequently, if there are multiple spectrum peaks of both two-dimensional Fourier spectra, there are multiple obtained frequencies of moiré, and thus there are multiple obtained intensities of moiré.

However, in a case where the intensities of moiré at the obtained frequencies of moiré are weak, moiré is not visually perceived. Thus, it is preferable to deal with only moiré of which the intensity of moiré is regarded to be weak and is equal to or greater than a predetermined value, for example, moiré of which the intensity is equal to or greater than −4.5.

Here, in the display device, the display resolution is determined, thus the highest frequency, at which display can be performed on the display device, is determined depending on the resolution thereof. Hence, moiré having a frequency higher than the highest frequency is not displayed on the display device, and therefore it is not necessary to set the moiré as an evaluation target. Accordingly, the highest frequency of moiré can be defined in accordance with the display resolution. Here, the highest frequency of moiré, which has to be considered in the present invention, can be set to 1000/Pd (cycle/mm) when the pixel pitch of the pixel array pattern of the display device is Pd (μm).

From the above description, in the present invention, in the frequencies and the intensities of moiré obtained from the spectrum peaks of both two-dimensional Fourier spectra, moiré as the evaluation target in the present invention is moiré, of which a frequency is equal to or less than the highest frequency of moiré of 1000/Pd, and moiré of which an intensity of moiré is equal to or greater than −4.5. In the present invention, the reason why moiré having the intensity of moiré equal to or greater than −4.5 is set as a target is as follows. If multiple moirés of which the intensity is less than −4.5 occur and thus the sum thereof is used, even originally invisible moiré may have to be scored. For this reason, in the present invention, a threshold value, which is equal to or greater than −4.5, is provided from an empirical visibility limit.

If there are multiple spectrum peaks of both two-dimensional Fourier spectra, there are multiple obtained frequencies of moiré, and thus it takes time to perform calculation processing, in such a case, the spectrum peaks of both two-dimensional Fourier spectra are provided in advance, spectrum peaks having weak peak intensities may be excluded, and only spectrum peaks having certain strong intensities may be selected. In that case, only the differences between the selected peaks are obtained, and thus it is possible to shorten the calculation time.

For example, as a target, convolution of the moiré spectrum and a visual transfer function (VTF) (the low frequency is 1.0) at the observation distance of 400 mm is performed, and thereafter it is possible to deal with only moirés with an intensity of −3.8 or more.

Here, in order to extract only moirés which are visible to human eyes, the VTF corresponding to the observation distance of 400 mm is used on the basis of scattering effects in a system.

The spectrum peaks, which remain in such a manner, can be set as spectrum peaks for moiré evaluation. At this time, it is preferable that only peaks equal to or greater than −3.8 as a common logarithm are used as the spectrum intensities.

Figure 15:
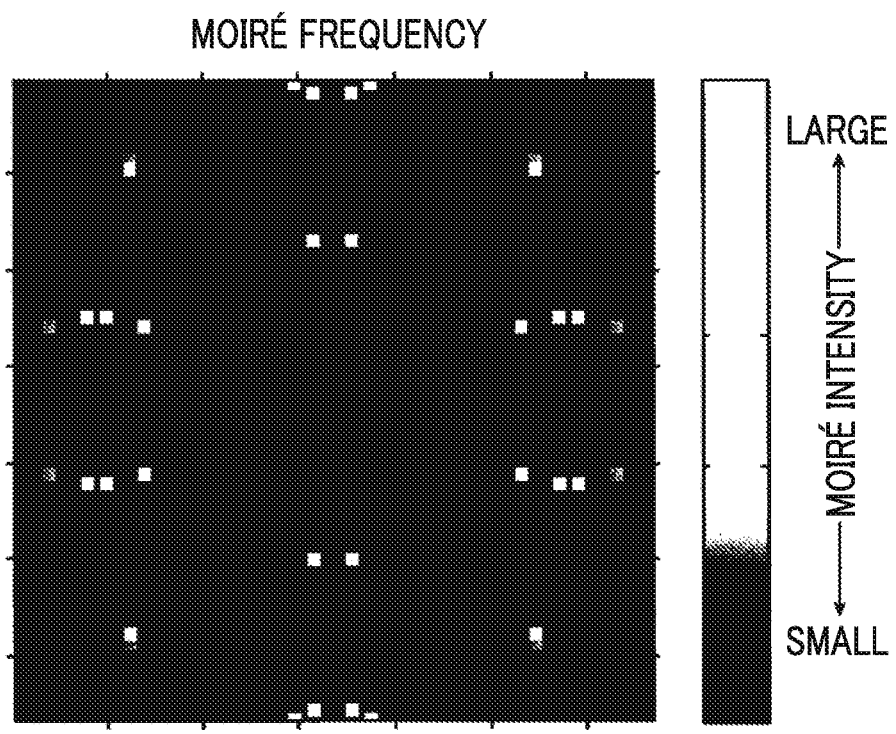
FIG. 15 is a schematic explanatory diagram schematically illustrating frequencies of moiré and intensities of moiré caused by interference between the pixel array pattern shown in FIG. 8A and the wiring pattern shown in FIG. 1.

FIG. 15 shows frequencies of moiré and intensities of moiré obtained in such a manner. FIG. 15 is a schematic explanatory diagram schematically illustrating the frequencies of moiré and the intensities of moiré caused by interference between the pixel array pattern shown in FIG. 8A and the wiring pattern shown in FIG. 1. Those may be results of convolution integration of intensity characteristics of the two-dimensional Fourier spectra shown in FIGS. 11A and 11B.

In FIG. 15, the frequencies of moiré are represented by position on the vertical axis, and the intensities of moiré are represented by gray (achromatic color) concentration, where as the thickness of the color decreases and the color becomes white, the frequency increases.

Next, in the process 5, moiré is digitized using the frequency and the intensity of moiré for each sub-pixel of each color of RGB calculated in the process 4 (step S18), and an indicator of evaluation of moiré is obtained.

That is, as shown in FIG. 7, in step S20, convolution of the visual transfer function (VTF) and the spectrum peaks for moiré evaluation remaining in step S18 is performed, and quantified.

Specifically, in step S20, in the frequencies and the intensities (absolute values) of moirés for the sub-pixels of the respective colors of RGB obtained in step S18, a plurality of evaluation values (sub-evaluation values) of moirés of the respective colors is calculated by applying human visual response characteristics (VTF) corresponding to the observation distance of 750 mm as an example of human visual response characteristics represented by the following Expression (2), that is, by performing convolution integration. Here, in order to score moiré, the VTF corresponding to the observation distance of 750 mm is used.

In such a manner, a sub-evaluation value of moiré, in which the common logarithm of the intensity is taken, is obtained for each color of RGB, and a worst value among the sub-evaluation values of moirés of RGB is set as the indicator (moiré value) of evaluation of moirés. A value of the indicator of evaluation of moirés is obtained as a value (common logarithm value) of a common logarithm of the indicator of evaluation of moirés represented by a common logarithm is obtained. It is preferable that evaluation is also performed by combining an evaluation image with RGB display in accordance with calculation of the worst value.

$$VTF = 5.05e^{-0.138u}(1 - e^{0.1u}) \quad (2)$$

$$u = \frac{\pi L f_r}{180}$$

Here, u is a spatial frequency (cycle/deg) defined by a solid angle, $f_r$ shown in the above-mentioned Expression (2) is a spatial frequency (cycle/mm) defined by a length, and L is an observation distance (mm).

The visual transfer function represented in the above-mentioned Expression (2) is called a Dooley-Shaw function, and is obtained with reference to description of a reference (R. P. Dooley, R. Shaw: Noise Perception in Electrophotography, J. Appl. Photogr. Eng., 5, 4 (1979), pp. 190-196).

The above-mentioned indicator of evaluation of moiré is obtained in a case where the conductive film 11 laminated on the display screen of the display unit 30 of the display device 40 is observed from the front of the display screen. However, the present invention is not limited to this, and the indicator of evaluation of moiré in a case where observation is performed in a direction oblique to the front may be obtained.

In the case where the indicator of evaluation of moiré is obtained in a case where observation is performed in a direction oblique to the front, the intensities of RGB of the display device 40 at the time of oblique observation are calculated at 90% of the luminance at the time of front observation, the process returns to step S14, and the peak frequencies and the peak intensities of the Fourier spectra of the respective colors are calculated again. Thereafter, steps S16 to S20 are repeated in the same manner, and the indicator of evaluation of moiré at the rime of oblique observation is calculated.

In such a manner, in step S22, if the indicators of evaluation of moiré are calculated at the time of front observation and oblique observation, in step S24, a large value (worst value) among the indicators of evaluation of moiré at the time of front observation and oblique observation is calculated as the indicator of evaluation of moiré to be provided for moiré evaluation.

In a case where only one of the front observation and the oblique observation is not performed, the indicator of evaluation of moiré at the front observation or the oblique observation is set as the indicator of evaluation of moiré to be directly provided for moiré evaluation.

Next, in the process 6, evaluation of the wiring pattern is performed on the basis of the indicator (worst value) of evaluation of moiré calculated in the process 5 (step S24).

That is, as shown in FIG. 7, in step S26, if a common logarithm value of the indicator of evaluation of moiré of the current mesh pattern 24 obtained in step S24 is equal to or less than a predetermined evaluation threshold value, it is evaluated that the current mesh pattern 24 is an optimized mesh pattern 24 of the conductive film 11 of the present invention, the current mesh pattern 24 is set as the optimized mesh pattern 24, and it is evaluated that the current mesh pattern 24 is in the conductive film 11 of the present invention.

The reason why the value of the indicator of evaluation of moiré is limited to be equal to or less than the predetermined evaluation threshold value as a common logarithm is as follows. If the value is greater than the predetermined evaluation threshold value, moiré, which is caused by interference between each sub-pixel array pattern of the BM pattern and the wiring pattern overlapping with each other, is visually perceived, and the visually perceived moiré offers a sense of discomfort to a user who observes the moiré. In a case where the value of the indicator of evaluation of moiré is equal to or less than the predetermined evaluation threshold value, the moiré may slightly offer a sense of discomfort, but does not matter.

Here, the predetermined value is appropriately set in accordance with shapes and properties of the conductive film and the display device. The shapes and properties includes a line width of the thin metal line 14 of the mesh pattern 24, a shape, an angle, and a size (such a pitch) of the opening portion 22, a phase angle (a rotation angle, and a deviation angle) of the wiring pattern of two conductive layers, a shape, a size (such a pitch), and an arrangement angle of the BM pattern 38, and the like. However, for example, the predetermined value is equal to or less than $-2.70$ ($10^{-2.70}$ as an antilogarithm) as a common logarithm. That is, for example, the indicator of evaluation of moiré is preferably equal to or less than $-2.70$ ($10^{-2.70}$ as an antilogarithm) as a common logarithm, more preferably equal to or less than $-2.80$ as a common logarithm, and yet more preferably equal to or less than $-3.00$ as a common logarithm.

Although described in detail later, the indicator of evaluation of moiré is obtained for each of the multiple mesh patterns 24, and three functional evaluators perform functional evaluation on moiré, which is caused by interference between the mesh pattern 24 and the sub-pixel array pattern of each color of three colors such as RGB of the BM pattern, with their own eyes. If the indicator of evaluation of moiré is equal to or less than $-2.70$ as a common logarithm, even when moiré, which is caused by interference between the superposed wiring pattern and the sub-pixel array pattern of each color of three colors such as RGB of the BM pattern, is visually perceived, the moirét may slightly offer a sense of discomfort but does not matter. If the indicator is equal to or less than $-2.80$ as a common logarithm, the most moiré does not matter. If the indicator is equal to or less than $-3.00$ as a common logarithm, the moiré does not matter.

Consequently, in the present invention, the indicator of evaluation of moiré is preferably specified to be equal to or less than $-2.70$ ($10^{-2.70}$ as an antilogarithm) as a common logarithm, more preferably specified to be equal to or less than $-2.80$ as a common logarithm, and yet more preferably specified to be equal to or less than $-3.00$ as a common logarithm.

It is apparent that a plurality of optimized mesh patterns 24 is obtained in accordance with the line width of the thin metal line 14 of the mesh pattern 24, the shape of the opening portion 22, the size (pitch and angle), a phase angle (a rotation angle, and a deviation angle) of the wiring pattern of two conductive layers, and the like. Here, a mesh pattern 24 having a small common logarithm value of the indicator of evaluation of moiré is a best mesh pattern 24, and a plurality of optimized mesh patterns 24 is prioritized.

In such a manner, the method of evaluating wiring on the conductive film of the present invention is terminated, and the sub-pixel array pattern of each color of the BM pattern of the display unit of the display device is superposed such that occurrence of moiré is suppressed. Thus, also for the display device with a different resolution, it is possible to provide the conductive film of the present invention which is excellent in moiré visibility regardless of the observation distance and has the optimized wiring pattern.

In the above-mentioned example of the conductive film 11 of the present invention shown in FIG. 3, only the second conductive portion 16b is formed on the conductive layer 28b, but the present invention is not limited to this. In a manner similar to a conductive film 11A shown in FIG. 16, the dummy electrode portion 26, which is electrically insulated from the second conductive portion 16b, may be provided at a position corresponding to the plurality of thin metal lines 14 of the first conductive portion 16a, like the conductive layer 28a. In this case, the wiring pattern 24 of the conductive layer 28a and the wiring pattern 24 of the conductive layer 28b are the same, and it is possible to further improve electrode visibility.

Figure 16:
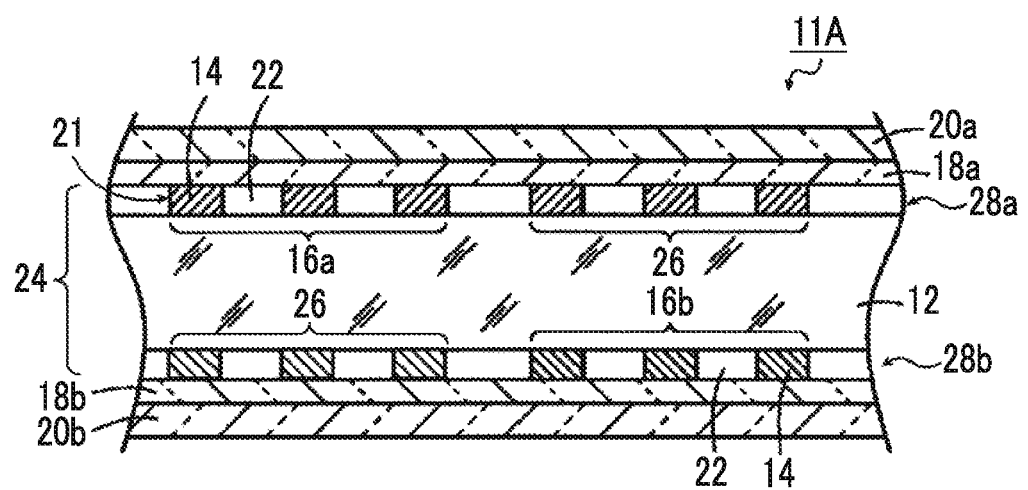
FIG. 16 is a partial cross-sectional view schematically illustrating an example of a conductive film according to another embodiment of the present invention.

In the example shown in FIG. 16, the conductive layer 28a and the conductive layer 28b have the same wiring pattern 24, and overlaps with each other without deviation so as to be formed as one wiring pattern 24. However, the respective wiring patterns of both the conductive layer 28a and the conductive layer 28b may overlap with each other while being shifted from each other if the wiring patterns satisfy an evaluation reference of the present invention, and the respective wiring patterns may be different.

The above-mentioned conductive film of the present invention has a mesh-shaped wiring pattern formed of continuous thin metal lines, and the present invention is not limited to this. As described above, if the evaluation reference of the present invention is satisfied, in a manner similar to the pattern shape of the mesh-shaped wiring pattern of the conductive film described in JP2012-276175 according to the present application of the applicants, the mesh-shaped wiring pattern, in which disconnections (breaks) are inserted into the thin metal lines, may be provided.

FIG. 17 is a partial enlarged plan view schematically illustrating another example of a conductive film according to another embodiment of the present invention, and a schematic diagram illustrating an example of the plurality of disconnection portions having the mesh pattern. In FIG. 17, in order to facilitate understanding, the electrode wiring pattern in the mesh-shaped wiring pattern of the mesh-shaped wires of the conductive film is indicated by heavy lines. However, it is apparent that the lines are formed of the same thin metal lines which are opaque, and thus there is no difference in the thicknesses of the lines.

In a conductive film 11B shown in FIG. 17, the conductive layer 28 shown in FIG. 2, the conductive layer 28a shown in FIG. 3, or each of the conductive layer 28a and 28b shown in FIG. 16 comprises a mesh-shaped wire 21 formed of the plurality of thin metal lines 14. Specifically, the mesh-shaped wire 21 has a wiring pattern in which the plurality of thin metal lines 14 is wired up to intersect in two directions, that is, a mesh-shaped wiring pattern 24 in which the plural thin metal lines 14 are arranged in a mesh shape. In the example shown in the drawing, a mesh shape of the opening portion 22 formed by the wiring pattern 24 is a rhomboid, and can be referred to as a diamond pattern.

The mesh-shaped wire 21 has an electrode portion 23a that comprises an electrode wiring pattern 24a which is formed of the plurality of thin metal lines 14 in a mesh shape so as to be continuous, and a dummy electrode portion (non-electrode portion) 23b that comprises a dummy electrode (non-electrode) wiring pattern 24b, which is similarly formed of the plurality of thin metal lines 14 in a mesh shape and which has the plurality of disconnection portions 25 so as to be discontinuous, and that is insulated from the electrode portion 23a. Here, in the example shown in the drawing, the electrode wiring pattern 24a of the electrode portion 23a and the dummy electrode wiring pattern 24b of the dummy electrode portion 23b are wiring patterns that have the same mesh shapes (rhomboids), and both patterns are combined to be formed as the wiring pattern 24 of the mesh-shaped wire 21.

The electrode portion 23a is formed of the conductive portion 16 of the conductive layer 28 shown in FIG. 2, the first conductive portion 16a of the conductive layer 28a shown in FIG. 3, or the first conductive portion 16a and the second conductive portion 16b of the respective conductive layers 28a and 28b shown in FIG. 16. The dummy electrode portion (non-electrode portion) 23b is formed of the dummy electrode portion 26 shown in FIGS. 3 and 16.

Here, the electrode wiring pattern 24a of the electrode portion 23a in the example shown in the drawing is an electrode pattern that constitutes X electrodes, and the present invention is not limited to this. Any electrode pattern may be used if it is an electrode pattern used in a capacitive touch sensor (panel). For example, the electrode pattern may be a conventional known electrode pattern of stripe electrodes, bar-and-stripe electrodes, diamond electrodes, snowflake electrodes, or the like.

The thin metal lines 14 formed in a mesh shape in the electrode portion 23a are continuous without the disconnection portions 25. In the thin metal lines 14 formed in a mesh shape in the dummy electrode portion 23b, the plurality of disconnection portions (cut-off portion) 25 is provided, and the plurality of disconnections is added. The disconnection portions 25 are necessarily provided between the thin metal lines 14 of the electrode portion 23a and the thin metal lines 14 of the dummy electrode portion 23b, the thin metal lines 14 of the electrode portion 23a and the thin metal lines 14 of the dummy electrode portion 23b are disconnected, and thus there is discontinuity. Consequently, the dummy electrode portion 23b is electrically insulated from the electrode portion 23a.

As described above, the wiring pattern 24 of the mesh-shaped wire 21 is a mesh pattern including the plurality of disconnection portions 25.

EXAMPLES

Hereinafter, the present invention will be described in detail on the basis of examples.

Regarding the sub-pixel array patterns of the sub-pixels 32g, 32r, and 32b of the BM pattern 38 of the display of 223 dpi shown in FIG. 8A, the patterns have rhomboidal pattern shapes shown in FIG. 18A, and the shapes and the sizes (pitches p and angles θ) of the opening portions 22 are different. Regarding the multiple mesh patterns 24 having different line widths of the thin metal lines 14, the mesh pattern 24 and the sub-pixel array pattern of each color of the BM pattern 38 overlap with each other with a simulation sample and a real sample. With such a configuration, the indicator of evaluation of moiré was obtained, and the three functional evaluators performed functional evaluation on moiré, which is caused by interference between both overlapping patterns in a simulation image of moiré, with their eyes.

Here, as shown in FIG. 7, regarding evaluation of moiré, functional evaluation was performed in the following manner: the transmittance data of the mesh pattern 24 used in step S16 was superposed on the luminance image data of the sub-pixel array pattern of each color of the pixel array (BM) pattern 38 used in step S14; an inverse transform image of moiré, in which a transmittance image is superposed on a luminance image, was created, and was displayed on the display; and the three functional evaluators observed the displayed inverse transform image.

Results thereof are shown in Table 1

Here, the functional evaluation results were obtained in the following manner. The moiré is evaluated on 5 levels of 1 to 5. In a case where there is at least one functional evaluator who evaluates that moiré is visually perceived as an obstacle, the evaluation that "moiré is perceived as an obstacle" is set to level 5. In a case where there is no functional evaluator who makes an evaluation which is set to level 5 and there is at least one functional evaluator who evaluates that moirés is visually perceived and offers a sense of discomfort, the evaluation that "moiré offers a sense of discomfort" is set to level 4. In a case where there is no functional evaluator who makes an evaluation which is set to level 4 or level 5 and there is at least one functional evaluator who evaluates that moiré slightly offers a sense of discomfort but is somewhat difficult to sense, the evaluation that "moiré is somewhat difficult to sense" is set to level 3. In a case where there is no functional evaluator who makes an evaluation which is set to level 3, 4, or 5 and there is at least one functional evaluator who evaluates that moiré slightly offers a sense of discomfort but is more difficult to sense, that is, in a case where all the evaluators evaluate that moiré is more difficult to sense or most difficult to sense, the evaluation that "moiré is more difficult to sense" is set to level 2. In a case where all the evaluators evaluate that moiré is most difficult to sense, the evaluation that "moiré is most difficult to sense" is set to level 1.

In terms of moiré visibility, moiré is allowable if the evaluation level is equal to or less than 3. However, it is preferable that the evaluation level is equal to or less than 2, and it is most preferable that the evaluation level is 1.

In the present example, the shape of the opening portion 22 of the mesh pattern 24 was changed such that the pitch p is changed in increments of 20 μm in a range of 100 μm to 200 μm and the angle θ was changed to 30°, 35°, and 40°.

Further, the line width of the mesh pattern 24 was changed to 2 pun and 4 μm.

In addition, in the BM pattern 38 with 233 dpi shown in FIG. 8A, each G sub-pixel (G channel color filter) 32g has a rectangular shape having a size of a width of 8 μm and a length of 43 μm, each R sub-pixel (R channel color filter) 32r has a rectangular shape having a size of a width of 21 μm and a length of 28 μm, and each B sub-pixel (B channel color filter) 32b has a rectangular shape which has a square notch having a size of 5 μm×5 μm on the lower right side thereof in the drawing and which has a size of a width of 21 μm and a length of 43 μm. The single pixel 32, which is indicated by the dotted line in the drawing, has a square shape having a size of 110 μm×110 μm.

For imaging the sub-pixel array pattern of each color of the pixel array (BM) pattern 38, STM6 (manufactured by OLYMPUS Corp.) was used as the microscope, UMPlan-FIx10 (manufactured by OLYMPUS Corp.) was used as the lens, and QIC-F-CLR-12-C (manufactured by Linkam Scientific Instruments Corp.) was used as the camera. Here, as the imaging conditions, for example, a gain was set to 1.0, and white balance (G, R, B) was set to (1.00, 2.17, 1.12). Further, the captured image was subjected to shading correction.

Calculation of the indicator of evaluation of moiré was performed as described above in the method shown in FIG. 7.

TABLE 1

| | LINE WIDTH [μm] | ANGLE [deg] | PITCH [μm] | MOIRÉ VALUE | FUNCTIONAL EVALUATION RESULT |
|---|---|---|---|---|---|
| EXAMPLE 1 | 2 | 30 | 100 | −3.4222 | 1 |
| EXAMPLE 2 | 2 | 35 | 180 | −3.4085 | 1 |
| EXAMPLE 3 | 2 | 35 | 140 | −3.2515 | 1 |
| EXAMPLE 4 | 2 | 35 | 120 | −3.0882 | 1 |
| EXAMPLE 5 | 2 | 40 | 100 | −3.0605 | 1 |
| EXAMPLE 6 | 2 | 40 | 140 | −3.0539 | 1 |

TABLE 1-continued

| | LINE WIDTH [μm] | ANGLE [deg] | PITCH [μm] | MOIRÉ VALUE | FUNCTIONAL EVALUATION RESULT |
|---|---|---|---|---|---|
| EXAMPLE 7 | 4 | 35 | 180 | −3.0514 | 1 |
| EXAMPLE 8 | 2 | 30 | 160 | −3.0448 | 1 |
| EXAMPLE 9 | 2 | 35 | 200 | −2.9343 | 2 |
| EXAMPLE 10 | 2 | 30 | 180 | −2.9143 | 2 |
| EXAMPLE 11 | 4 | 35 | 140 | −2.886 | 2 |
| EXAMPLE 12 | 2 | 40 | 180 | −2.8643 | 2 |
| EXAMPLE 13 | 2 | 30 | 120 | −2.8174 | 2 |
| EXAMPLE 14 | 4 | 35 | 120 | −2.8154 | 2 |
| EXAMPLE 15 | 2 | 35 | 100 | −2.7901 | 3 |
| EXAMPLE 16 | 4 | 40 | 140 | −2.7542 | 3 |
| EXAMPLE 17 | 4 | 30 | 160 | −2.7495 | 3 |
| EXAMPLE 18 | 4 | 40 | 100 | −2.7326 | 3 |
| EXAMPLE 19 | 2 | 30 | 200 | −2.7209 | 3 |
| COMPARATIVE EXAMPLE 1 | 2 | 35 | 160 | −2.6678 | 4 |
| COMPARATIVE EXAMPLE 2 | 4 | 35 | 200 | −2.6464 | 4 |
| COMPARATIVE EXAMPLE 3 | 4 | 30 | 180 | −2.6205 | 4 |
| COMPARATIVE EXAMPLE 4 | 4 | 30 | 100 | −2.6007 | 4 |
| COMPARATIVE EXAMPLE 5 | 2 | 30 | 140 | −2.5614 | 4 |
| COMPARATIVE EXAMPLE 6 | 4 | 40 | 180 | −2.5358 | 4 |
| COMPARATIVE EXAMPLE 7 | 2 | 40 | 200 | −2.5099 | 4 |
| COMPARATIVE EXAMPLE 8 | 4 | 30 | 200 | −2.4525 | 4 |
| COMPARATIVE EXAMPLE 9 | 2 | 40 | 160 | −2.4524 | 4 |
| COMPARATIVE EXAMPLE 10 | 4 | 35 | 160 | −2.3802 | 4 |
| COMPARATIVE EXAMPLE 11 | 4 | 30 | 140 | −2.3229 | 4 |
| COMPARATIVE EXAMPLE 12 | 4 | 30 | 120 | −2.2987 | 5 |
| COMPARATIVE EXAMPLE 13 | 4 | 35 | 100 | −2.2974 | 5 |
| COMPARATIVE EXAMPLE 14 | 2 | 40 | 120 | −2.2894 | 5 |
| COMPARATIVE EXAMPLE 15 | 4 | 40 | 200 | −2.2512 | 5 |
| COMPARATIVE EXAMPLE 16 | 4 | 40 | 160 | −2.1587 | 5 |
| COMPARATIVE EXAMPLE 17 | 4 | 40 | 120 | −2.0335 | 5 |

Table 1 shows Examples 1 to 19 for various mesh patterns 24 and Comparative Examples 1 to 17.

Here, in Examples 1 to 8 shown in Table 1, the line widths of the thin metal lines 14 are 2 μm and 4 μm, the shape of the opening portion 22 of the mesh pattern 24 is a rhomboidal pattern shown in FIG. 18A, the pitch p is in a range of 100 to 180 μm, and the angle θ is in a range of 30° to 40°. All the evaluation values (indicators of evaluation) of moiré are equal to or less than −3.00 as a common logarithm. The functional evaluation values are 1, and the evaluation values mean a highest level of the evaluation that "moiré is most difficult to sense" at which all the evaluators evaluate that "moiré is most difficult to sense".

Next, in Examples 9 to 14 shown in Table 1, the line widths of the thin metal lines 14 are 2 μm and 4 μm the shape of the opening portion 22 of the mesh pattern 24 is a rhomboidal pattern shown in FIG. 18A, the pitch p is in a range of 120 to 200 μm, and the angle θ is in a range of 30° to 40°. All the evaluation values (indicators of evaluation) of moiré are greater than −3.00 and equal to or less than −2.80 as a common logarithm. The functional evaluation values are 2, and the evaluation values mean a level of the evaluation that "moiré is more difficult to sense" at which all the evaluators evaluate that moiré is more difficult to sense.

Further, in Examples 15 to 19 shown in Table 1, the line widths of the thin metal lines 14 are 2 μm and 4 μm, the shape of the opening portion 22 of the mesh pattern 24 is a rhomboidal pattern shown in FIG. 18A, the pitch p is in a range of 100 to 200 μm, and the angle θ is in a range of 30° to 40°. All the evaluation values (indicators of evaluation) of moiré are greater than −2.80 and equal to or less than −2.70 as a common logarithm. The functional evaluation values are 3, and the evaluation values mean a level of the evaluation, that "moiré is somewhat difficult to sense" at which all the evaluators evaluate that moiré slightly offers a sense of discomfort but is somewhat difficult to sense.

In contrast, in Comparative Examples 1 to 11, the line widths of the thin metal lines 14 are 2 μm and 4 μm, the shape of the opening portion 22 of the mesh pattern 24 is a rhomboidal pattern shown in FIG. 18A, the pitch p is in a range of 100 to 200 μm, and the angle θ is in a range of 30° to 40°. All the evaluation values (indicators of evaluation) of moiré are greater than −2.70 and equal to or less than −2.30 as a common logarithm. The functional evaluation values are 4, and the evaluation values mean a level of the evaluation that "moiré offers a sense of discomfort".

Further, in Comparative Examples 12 to 17, the line widths of the thin metal lines 14 are 2 μm and 4 μm, the shape of the opening portion 22 of the mesh pattern 24 is a rhomboidal pattern shown in FIG. 18A, the pitch p is in a range of 100 to 200 μm, and the angle θ is in a range of 30° to 40°. All the evaluation values (indicators of evaluation) of moiré are greater than −2.30 as a common logarithm. The functional evaluation values are 5, and the evaluation values mean a level of the evaluation that "moiré is perceived as an obstacle".

From the above Table 1, the following fact is found even in a case where the cycles and the intensities of the sub-pixel patterns of the respective colors of the BM pattern are different. Even in case where the wiring pattern is a certain pattern, that is, even in a case where the line width of the thin metal line, the shape and the size (the pitch and the angle) of the opening portion, and the like have any values, if the indicator of evaluation of moiré is equal to or less than −2.70 as a common logarithm, moiré, which is caused by interference between the superposed wiring pattern and the sub-pixel pattern of each color of the BM pattern, is visually perceived, and the evaluation level of the moiré is equal to or greater than a level at which the moiré slightly offers a sense of discomfort but is somewhat difficult to sense. If the indicator of evaluation of moiré is equal to or less than −2.80 as a common logarithm, even if moiré is visually perceived, the evaluation level of the moiré is equal to or greater than a level at which the moiré is more difficult to sense. If the indicator of evaluation of moiré is equal to or less than −3.00 as a common logarithm, the evaluation level of the moiré is a level at which the moiré is most difficult to sense.

From the above description, the conductive film of the present invention, which has the wiring pattern which allows the indicator of evaluation of moiré to satisfy the range, is able to suppress occurrence of moiré at the time of both front observation and oblique observation even when the cycles and the intensities of the sub-pixel patterns of the respective colors of the BM pattern of the display are different. As a result, it is possible to greatly improve visibility.

From the above description, effects of the present invention are clarified.

In the present invention, in a manner similar to that of the above-mentioned examples, wiring patterns having various pattern shapes are provided in advance, and thus it is possible to determine the conductive film that has a wiring pattern optimized in the evaluation method of the present invention. However, in a case where the indicator of evaluation of moiré for the single wiring pattern is less than a predetermined value, it is possible to determine the conductive film which has the optimized wiring pattern by repeating the following process: transmittance image data of the wiring pattern is updated to transmittance image data of a new wiring pattern, and the indicator of evaluation of moiré is obtained by applying the above-mentioned evaluation method of the present invention.

Here, the updated new wiring pattern may be provided in advance, and may be newly formed. It should be noted that, in the case where the pattern is newly formed, any one or more of the rotation angle, the pitch, and the pattern width of the transmittance image data of the wiring pattern may be changed, and the shape and the size of the opening portion of the wiring pattern may be changed. Further, those may be randomly set.

Hereinbefore, the conductive film according to the present invention, the display device comprising the conductive film, and the method of evaluating the conductive film have been described with reference to various embodiments and examples. However, it is apparent that the present invention is not limited to the embodiments and the examples and may be improved or modified in various forms without departing from the scope of the present invention.

EXPLANATION OF REFERENCES 10, 11, 11A, 11B: conductive film
12: transparent substrate
14: thin line made of metal (thin metal line)
16, 16a, 16b: conductive portion
18, 18a, 18b: adhesive layer
20, 20a, 20b: protective layer
21: mesh-shaped wire
22: opening portion
23a: electrode portion
23b: dummy electrode portion (non-electrode portion)
24: wiring pattern
24a: electrode wiring pattern
24b: dummy electrode wiring pattern
25: disconnection portion (cut-off portion)
26: dummy electrode portion
28, 28a, 28b: conductive layer
30: display unit
32, 32r, 32g, 32b: pixel
34: black matrix (BM)
38: BM pattern
40: display device
44: touch panel

What is claimed is:

1. A conductive film that is provided on a display unit of a display device, the conductive film comprising:
a transparent substrate; and
a conductive portion that is formed on at least one surface of the transparent substrate and has a plurality of thin metal lines,
wherein the plurality of thin metal lines has a wiring pattern formed in a mesh shape, and a plurality of opening portions is arrayed on the conductive portion,
wherein in the display unit, pixels, which include a plurality of sub-pixels emitting light with a plurality of colors that are at least three colors different from each other, are arrayed in pixel array patterns which are repeated in a certain direction and a direction perpendicular to the certain direction,
wherein the display unit satisfies at least any one of a condition in which forms of the sub-pixels for at least two colors different from each other among the plurality of colors are different, a condition in which cycles of sub-pixel array patterns formed by arrays of the sub-pixels having respective colors of the plurality of colors are different, or a condition in which at least one of barycenters of the plurality of sub-pixels within a single pixel of the pixels is at a position different from that of a straight line connecting at least two of the barycenters of the other sub-pixels,
wherein the conductive film is provided on the display unit such that the wiring pattern of the conductive portion overlaps the pixel array patterns of the display unit, and
wherein from at least one point of view, the wiring pattern is formed such that an indicator of evaluation of moirés is equal to or less than an evaluation threshold value, where in frequencies and intensities of the moirés of the respective colors calculated from a first peak frequency and a first peak intensity of a plurality of first spectrum peaks of two-dimensional Fourier spectra of transmittance image data of the wiring pattern and a second peak frequency and a second peak intensity of a plurality of second spectrum peaks of two-dimensional Fourier spectra of luminance image data of the sub-pixel array patterns of the respective colors of the plurality of colors, the indicator of evaluation is calculated from evaluation values of the moirés of the respective colors obtained by applying human visual response characteristics in accordance with an observation distance to intensities of the moirés equal to or greater than a first intensity threshold value among intensities of the moirés at frequencies of the moirés equal to or less than a frequency threshold value prescribed on the basis of a display resolution of the display unit.

2. The conductive film according to claim 1,
wherein the evaluation threshold value is −2.70, and
wherein the indicator of evaluation is equal to or less than −2.70 as a common logarithm.

3. The conductive film according to claim 1, wherein the condition, in which the forms of the sub-pixels are different, includes a condition in which sizes or areas of the sub-pixels are different.

4. The conductive film according to claim 1, wherein the condition, in which the cycles of the sub-pixel array patterns are different, includes a condition in which, assuming that, in a display screen of the display unit, the certain direction is a horizontal direction, the horizontal direction is an x direction, and a direction perpendicular to the x direction is a y direction, cycles of the sub-pixels for at least two colors different from each other do not coincide in at least one direction of the x direction or the y direction.

5. The conductive film according to claim 1, wherein satisfying the at least any one condition is
satisfying any one of a condition in which, regarding any two colors of the plurality of colors, a difference between a position of a barycenter of the sub-pixel for one color and a position of a barycenter of the sub-pixel for the other color in the certain direction is less than 3P/10, a condition in which the difference is greater than 11P/30 and less than 3P/5, and a condition in which the difference is greater than 11P/15, where P is a pixel pitch of the pixel array patterns, or satisfying any one of a condition in which, regarding any single color of the plurality of colors, a difference between a position of a barycenter of the sub-pixel for the single color and a position of a barycenter of the sub-pixel for the single color of an adjacent pixel in the direction perpendicular to the certain direction is less than 9P/10, and a condition in which the difference is greater than 11P/10.

6. The conductive film according to claim 1, wherein the luminance image data of the sub-pixel array pattern of each color of the plurality of colors is normalized luminance data that is obtained by normalizing the luminance image data obtained by converting captured image data, which is obtained by capturing an image of the sub-pixel array pattern of a color displayed on the display screen of the display unit for each color, into luminance values.

7. The conductive film according to claim 6,
wherein the plurality of colors is three colors such as red, green, and blue,
wherein the image of the sub-pixel array pattern of the color displayed on the display screen of the display unit is displayed at a maximum luminance which can be set in the display unit, and
wherein the normalized luminance data of each color is normalized by a maximum luminance value of green.

8. The conductive film according to claim 7,
wherein the captured image data of the image of the sub-pixel array pattern of each color of red, green, and blue is image data that is obtained by imaging after adjusting white balance to a white color of a Macbeth chart,
wherein assuming that image data of red is R, image data of green is G, image data of blue is B, and a luminance value is Y, the image data R, G, and B of red, green, and blue is converted into a luminance value Y through the following Expression (1), $$Y=0.300R+0.590G+0.110B \quad (1),\text{ and}$$

wherein the luminance image data of each color is obtained by normalizing the maximum luminance value of green to 1.0.

9. The conductive film according to claim 7,
wherein the luminance image data of the image of the sub-pixel array pattern of each color of red, green, and blue is data that is obtained by setting an integral value, which is calculated by performing integration of a luminance of each XYZ color matching function on spectrum data of each color of red, green, and blue, as a value of mask data created from captured image data which is obtained by displaying each color of red, green, and blue on the sub-pixel of the color and by imaging the color through a microscope, where the spectrum data of each color of red, green, and blue is acquired by displaying each color of red, green, and blue on the sub-pixel of the color and measuring the color by a spectrometer, and
wherein the luminance image data of each color is obtained by normalizing the luminance image data of the maximum of green to 1.0.

10. The conductive film according to claim 1,
wherein the plurality of first spectrum peaks has a peak intensity that is equal to or greater than a first threshold value which is selected from a plurality of spectrum peaks obtained by performing two-dimensional Fourier transform on transmittance image data of the wiring pattern, and wherein for each of the plurality of colors, the plurality of second spectrum peaks has a peak intensity that is equal to or greater than a second threshold value which is selected from a plurality of spectrum peaks obtained by performing two-dimensional Fourier transform on the luminance image data of the sub-pixel array pattern.

11. The conductive film according to claim 1,
wherein a frequency of a moiré corresponding to each color is given as a difference between the first peak frequency and the second peak frequency corresponding to each color, and
wherein an intensity of the moiré corresponding to each color is given as a product between the first peak intensity and the second peak intensity corresponding to each color.

12. The conductive film according to claim 1, wherein an evaluation value of the moiré is calculated by weighting a visual transfer function, which corresponds to the observation distance as the visual response characteristics, to the frequency and the intensity of the moiré through convolution integration.

13. The conductive film according to claim 12, wherein the visual transfer function VTF is given by the following Expression (2):

$$VTF = 5.05e^{-0.138u}(1 - e^{0.1u}) \quad (2)$$

$$u = \frac{\pi L f_r}{180}$$

where u is a spatial frequency (cycle/deg) defined by a solid angle, $f_r$ shown in the above-mentioned Expression (2) is a spatial frequency (cycle/mm) defined by a length, and L is an observation distance (mm).

14. The conductive film according to claim 1, wherein the indicator of evaluation of the moirés is calculated using a largest evaluation value among the evaluation values of the plurality of the moirés in which a frequency of one of the moirés is weighted in accordance with the observation distance for each color.

15. The conductive film according to claim 14, wherein the indicator of evaluation of the moirés is a largest sum among sums for the plurality of colors, the sums being obtained by adding the largest evaluation values of the frequencies of all the moirés for each color, each of the largest evaluation values being selected with respect to the frequency of one of the moirés for each color.

16. The conductive film according to claim 1,
wherein the first intensity threshold value is −5 as a common logarithm, and the frequency threshold value is a highest frequency of the moirés, and
wherein a moiré, which is selected in order to apply the visual response characteristics, has an intensity which is equal to or greater than −5, and has a frequency which is equal to or less than the highest frequency.

17. The conductive film according to claim 1,
wherein from at least two points of view of front observation and oblique observation, the evaluation value is obtained for each color of the plurality of colors, and
wherein the indicator of evaluation is a largest evaluation value among evaluation values of respective colors obtained in the at least two points of view.

18. A display device comprising:
a display unit in which pixels, which include a plurality of sub-pixels emitting light with a plurality of colors that are at least three colors different from each other, are arrayed in pixel array patterns which are repeated in a certain direction and a direction perpendicular to the certain direction, the display unit satisfying at least one of a condition in which forms of the sub-pixels for at least two colors different from each other among the plurality of colors are different, or a condition in which cycles of sub-pixel array patterns formed by arrays of the sub-pixels having respective colors are different; and the conductive film according to claim 1, the conductive film being provided on the display unit.

19. A method of evaluating a conductive film that is provided on a display unit of a display device and has a wiring pattern which is formed of a plurality of thin metal lines and has a mesh shape and in which a plurality of opening portions is arrayed, the method comprising:

causing the display unit, in which pixels including a plurality of sub-pixels emitting light with a plurality of colors that are at least three colors different from each other are arrayed in pixel array patterns which are repeated in a certain direction and a direction perpendicular to the certain direction, to satisfy at least any one of a condition in which forms of the sub-pixels for at least two colors different from each other among the plurality of colors are different, a condition in which cycles of sub-pixel array patterns formed by arrays of the sub-pixels having respective colors of the plurality of colors are different, or a condition in which at least one of barycenters of the plurality of sub-pixels within a single pixel of the pixels is at a position different from that of a straight line connecting at least two of the barycenters of the other sub-pixels;

acquiring transmittance image data of the wiring pattern and luminance image data of the sub-pixel array pattern of each color of the plurality of colors of the display unit;

calculating a first peak frequency and a first peak intensity of a plurality of first spectrum peaks of two-dimensional Fourier spectra of transmittance image data of the wiring pattern and a second peak frequency and a second peak intensity of a plurality of second spectrum peaks of two-dimensional Fourier spectra of luminance image data of the sub-pixel array patterns of the respective colors of the plurality of colors, for each color, by performing two-dimensional Fourier transform on the transmittance image data of the wiring pattern and the luminance image data of the sub-pixel array pattern, from at least one point of view;

calculating frequencies and intensities of moirés of the respective colors of the plurality of colors from the first peak frequency and the first peak intensity of the wiring pattern and the second peak frequency and the second peak intensity of the sub-pixel array patterns of the respective plurality of colors calculated in the above-mentioned manner;

selecting moirés having frequencies equal to or less than a frequency threshold value and intensities equal to or greater than a first intensity threshold value prescribed on the basis of a display resolution of the display unit, among the frequencies and intensities of the moirés of the respective colors calculated in the above-mentioned manner;

acquiring evaluation values of the moirés of the respective colors by applying human visual response characteristics in accordance with an observation distance to the intensities of the moirés at respective frequencies of the moirés of the respective colors selected in the above-mentioned manner;

calculating an indicator of evaluation of the moirés from the evaluation values of the moirés of the respective colors acquired in the above-mentioned manner; and evaluating the conductive film of which the indicator of evaluation of the moirés calculated in the above-mentioned manner is equal to or less than a predetermined value.

20. The method of evaluating the conductive film according to claim 19, wherein the luminance image data of the sub-pixel array pattern of each color of the plurality of colors of the display unit is normalized luminance data that is obtained by normalizing the luminance image data obtained by converting captured image data, which is obtained by capturing an image of the sub-pixel array pattern of a color displayed on the display screen of the display unit for each color, into luminance values.

\* \* \* \* \*